Jan. 10, 1950  R. E. HERSEY  2,494,475
FRINGE OFFICE ARRANGEMENT
Filed April 25, 1945  15 Sheets-Sheet 1
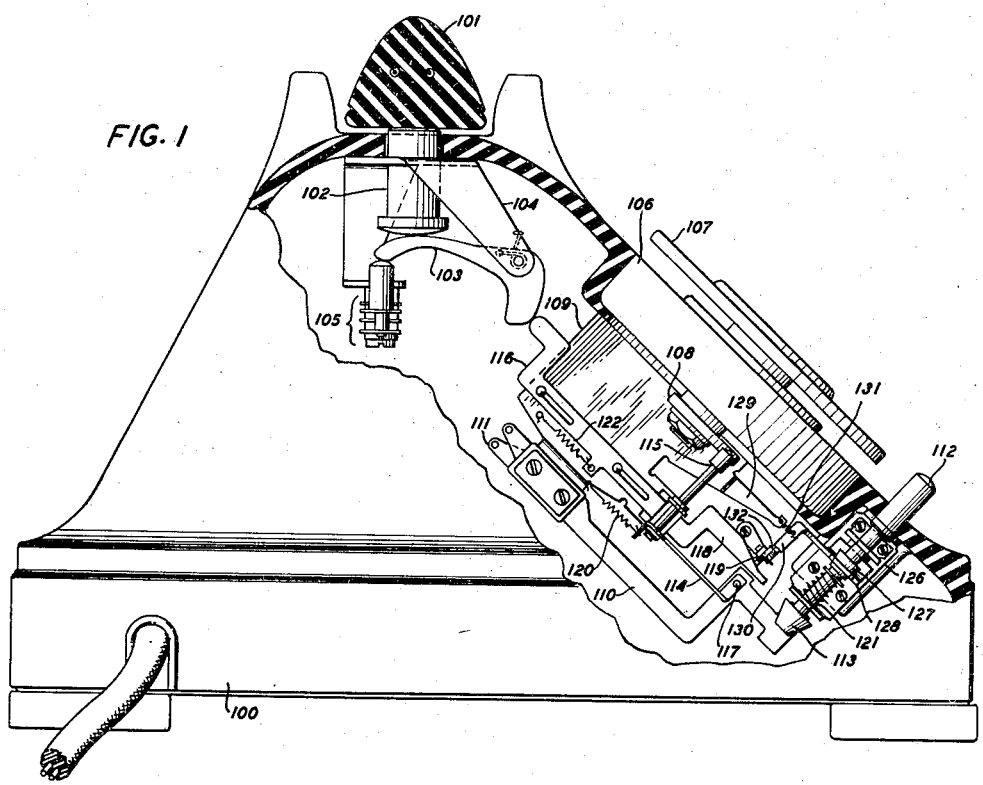
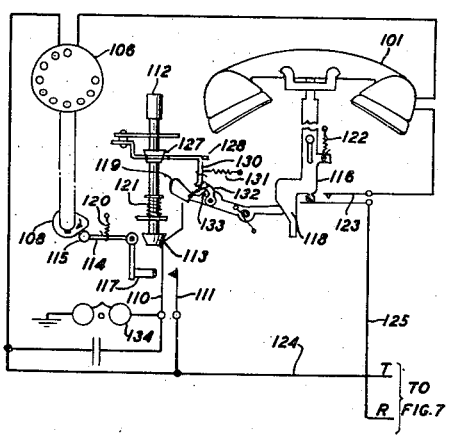
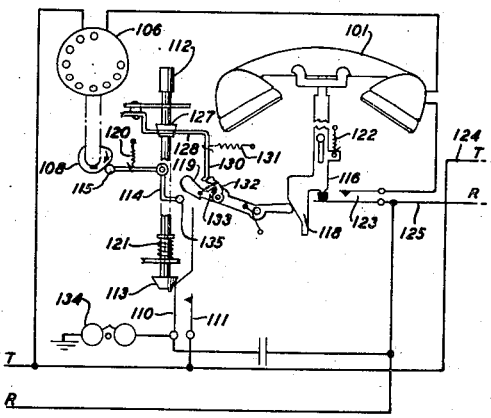
INVENTOR
R. E. HERSEY
BY C. Mathieu
ATTORNEY Jan. 10, 1950  R. E. HERSEY  2,494,475
FRINGE OFFICE ARRANGEMENT
Filed April 25, 1945  15 Sheets-Sheet 2

INVENTOR
R. E. HERSEY
BY
C. Mattice
ATTORNEY

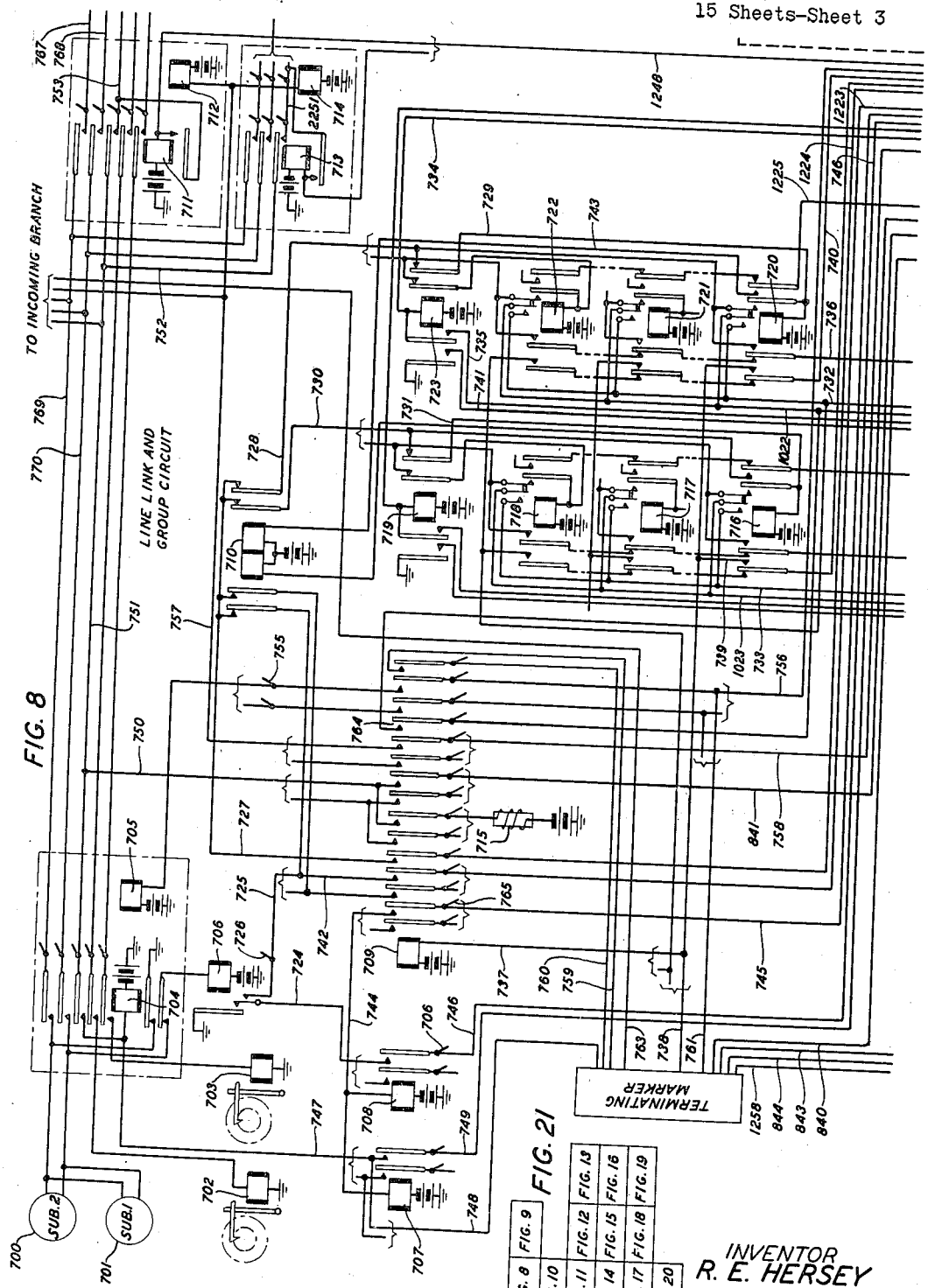

Jan. 10, 1950  R. E. HERSEY  2,494,475
FRINGE OFFICE ARRANGEMENT
Filed April 25, 1945  15 Sheets-Sheet 4

INVENTOR
R. E. HERSEY
BY C. Mattice
ATTORNEY

Jan. 10, 1950  R. E. HERSEY  2,494,475
FRINGE OFFICE ARRANGEMENT
Filed April 25, 1945  15 Sheets-Sheet 8

INVENTOR
R. E. HERSEY
BY
C. Mattice
ATTORNEY.

Jan. 10, 1950     R. E. HERSEY     2,494,475
FRINGE OFFICE ARRANGEMENT
Filed April 25, 1945     15 Sheets-Sheet 13

INVENTOR
R. E. HERSEY
BY C. Mattice
ATTORNEY

Jan. 10, 1950 R. E. HERSEY 2,494,475
FRINGE OFFICE ARRANGEMENT
Filed April 25, 1945 15 Sheets-Sheet 14

INVENTOR
R. E. HERSEY
BY
C. Mattice
ATTORNEY

Jan. 10, 1950     R. E. HERSEY     2,494,475
FRINGE OFFICE ARRANGEMENT

Filed April 25, 1945     15 Sheets-Sheet 15

FIG. 20

INVENTOR
R. E. HERSEY
BY C. Mattice

ATTORNEY

Patented Jan. 10, 1950

2,494,475

UNITED STATES PATENT OFFICE 2,494,475

FRINGE OFFICE ARRANGEMENT

Ralph E. Hersey, Madison, N. J., assignor to Bell Telephone Laboratories, Incorporated, New York, N. Y., a corporation of New York Application April 25, 1945, Serial No. 590,260

14 Claims. (Cl. 179—18)

This invention relates to telephone systems and has for its object to facilitate the establishment of interoffice connections.

It frequently occurs that small towns on the outskirts of a metropolitan area have such community of interest that the telephone service required is very largely local in character. It is therefore possible to provide such local service by means of comparatively simple dial switching equipment and to place all interoffice service under the control of tandem equipment located within the metropolitan area.

In accordance with the present invention, in such a local office employing cross bar type dial switching equipment, means is provided under the control of a key at the substation for automatically connecting the calling line with a trunk to a tandem office.

More specifically, the tandem key when operated connects ground through the ringer to the tip conductor of the line and when the line has been extended to the control circuit or sender, means responsive to this ground serves to automatically connect the line with a trunk outgoing to the tandem equipment and to release the sender. The ground detecting means prevents the transmission of dial tone from the local sender.

According to the preferred form of the invention the ground detecting means in the sender returns a signal to the sender link control circuit which wipes out the selection of the district junctor and causes the control circuit to test for and extend the calling line to an idle trunk to the tandem office.

According to an alternative form of the invention the ground detecting means of the sender transmits a signal to the marker which causes the marker to select an idle trunk to the tandem office and to extend the line thereto through a district junctor.

These and other features of the invention will be more clearly understood from a consideration of the following description read in connection with the drawing in which:

Fig. 1 shows, partly in section a tip party subscriber's set equipped to function with the circuits of the present invention;

Fig. 6 is a diagrammatic showing of the equipment and circuits at the tip party substation;

Fig. 7 is a diagrammatic showing of the equipment and circuits at the ring party substation;

Figs. 8 to 20 show the circuits employed in connecting a calling line with a sender, a district incoming link and a tandem trunk;

Figure 9:
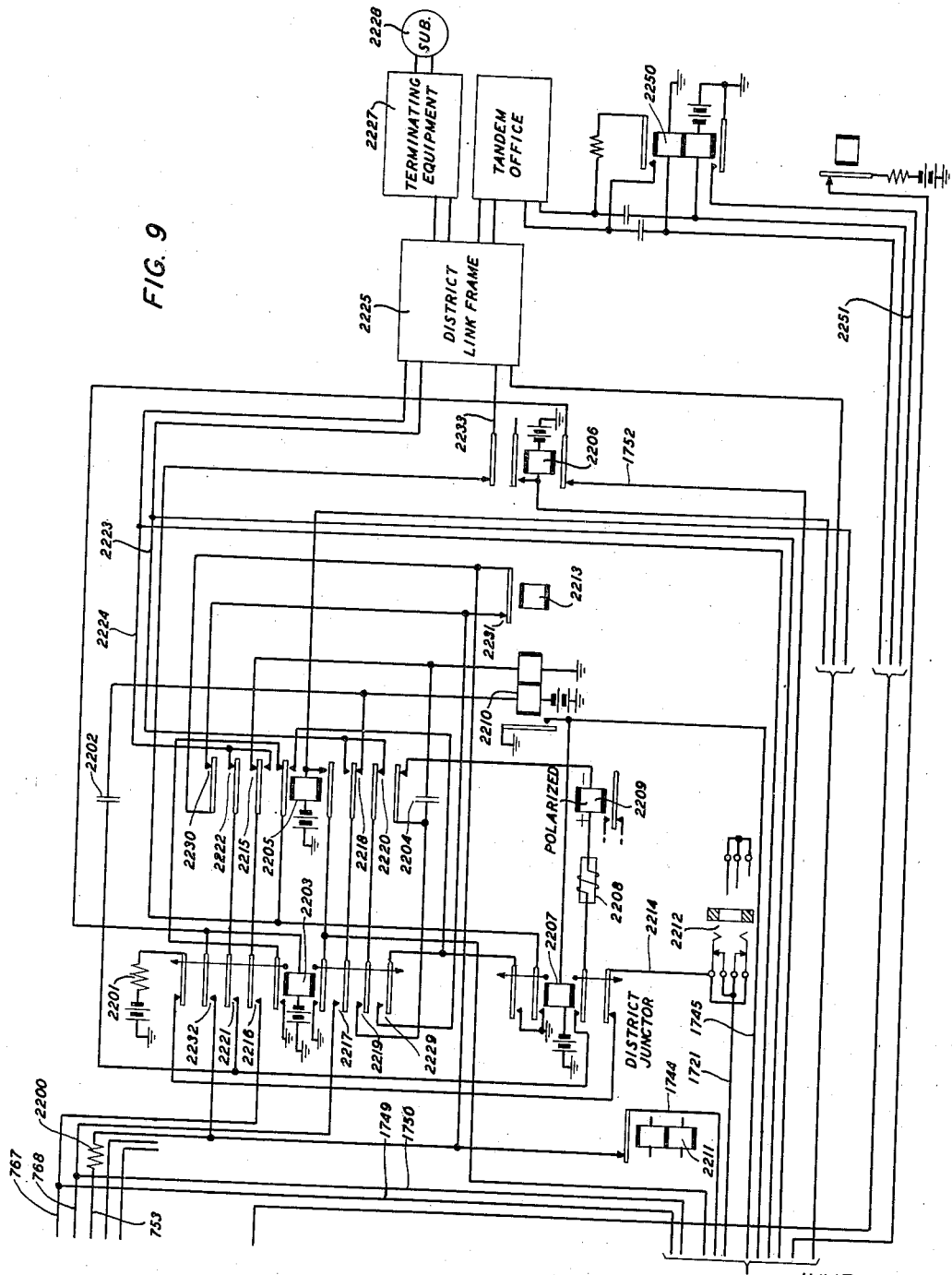
Figure 10:
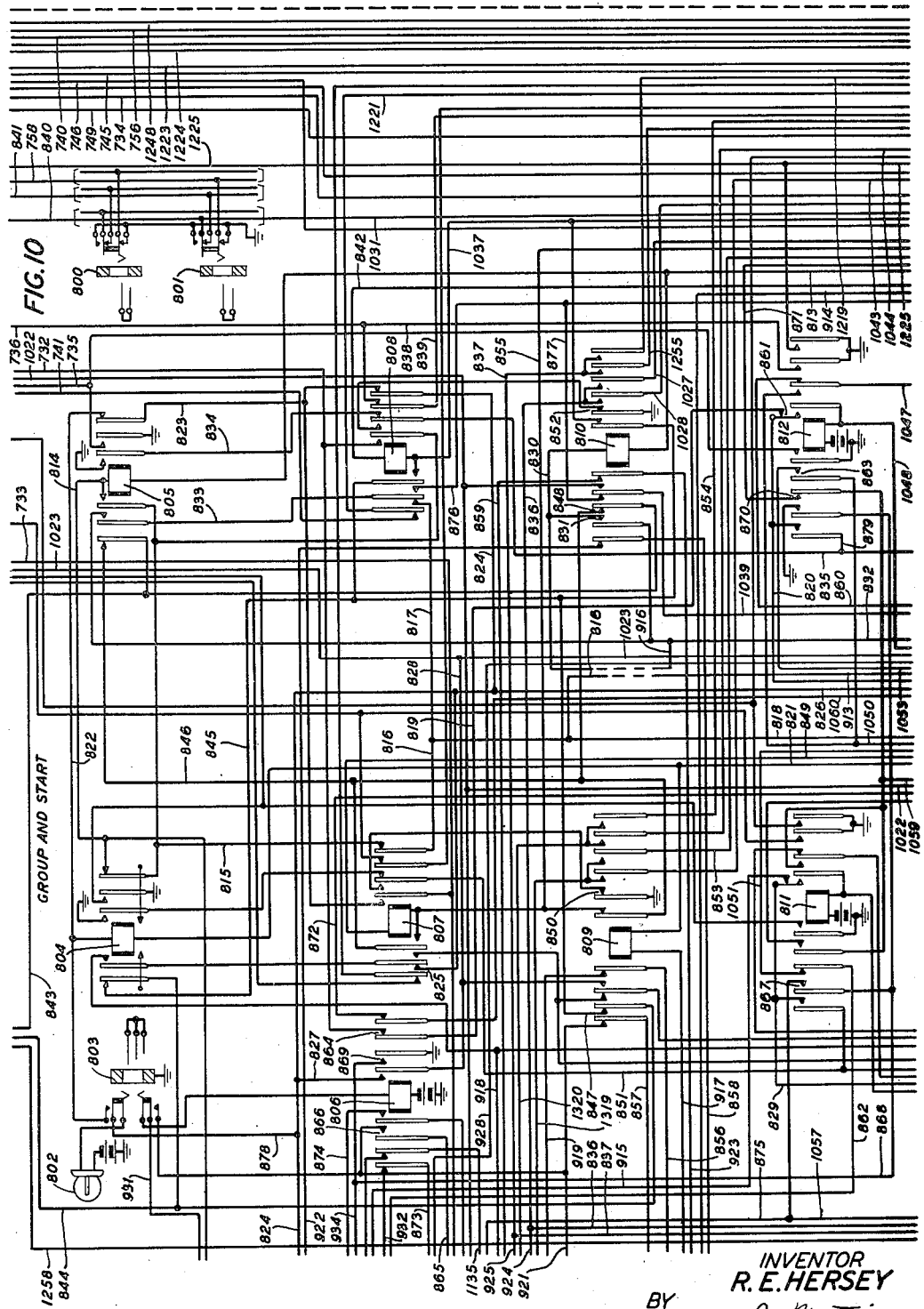
Figure 11:
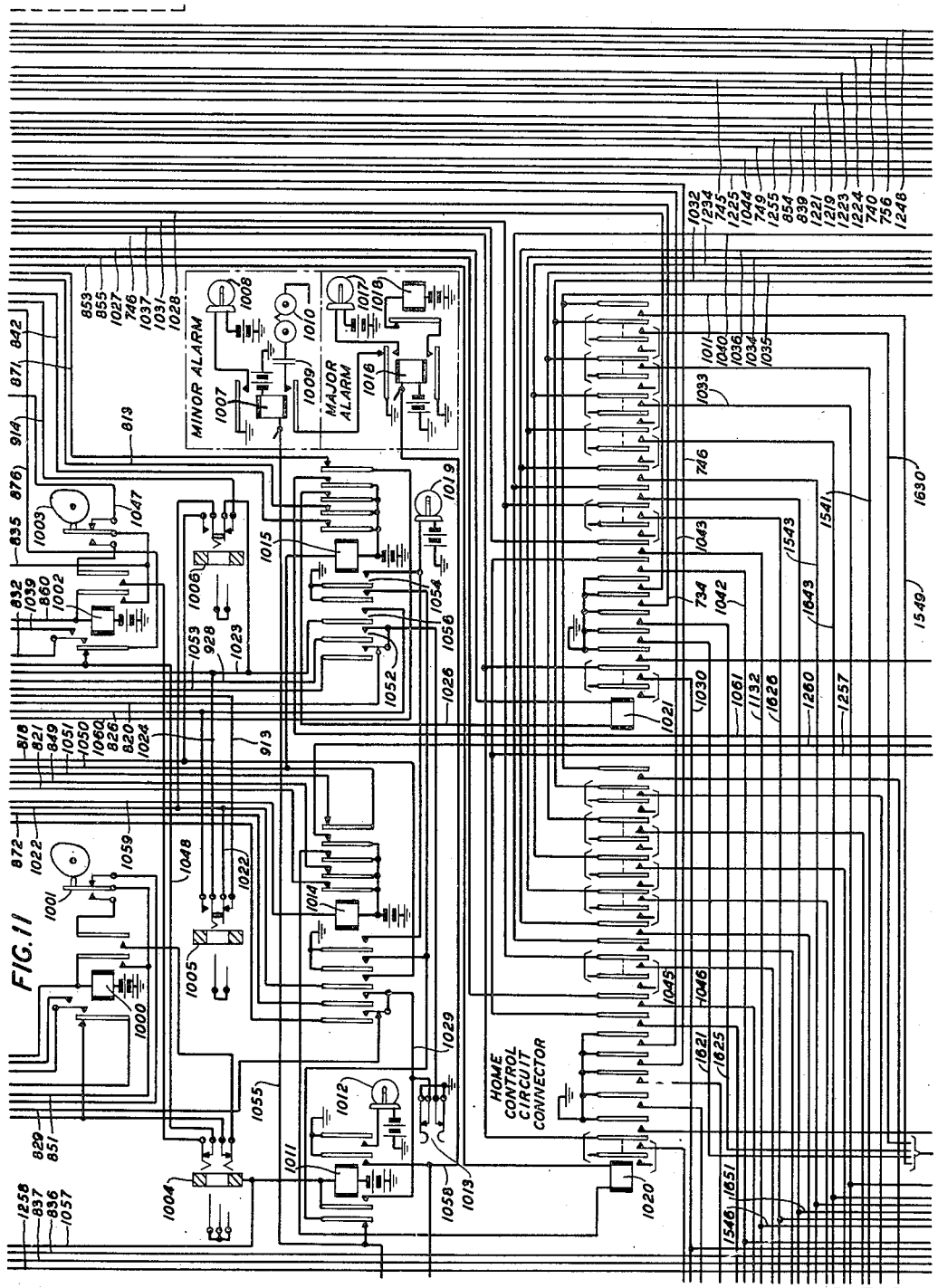
Figure 12:
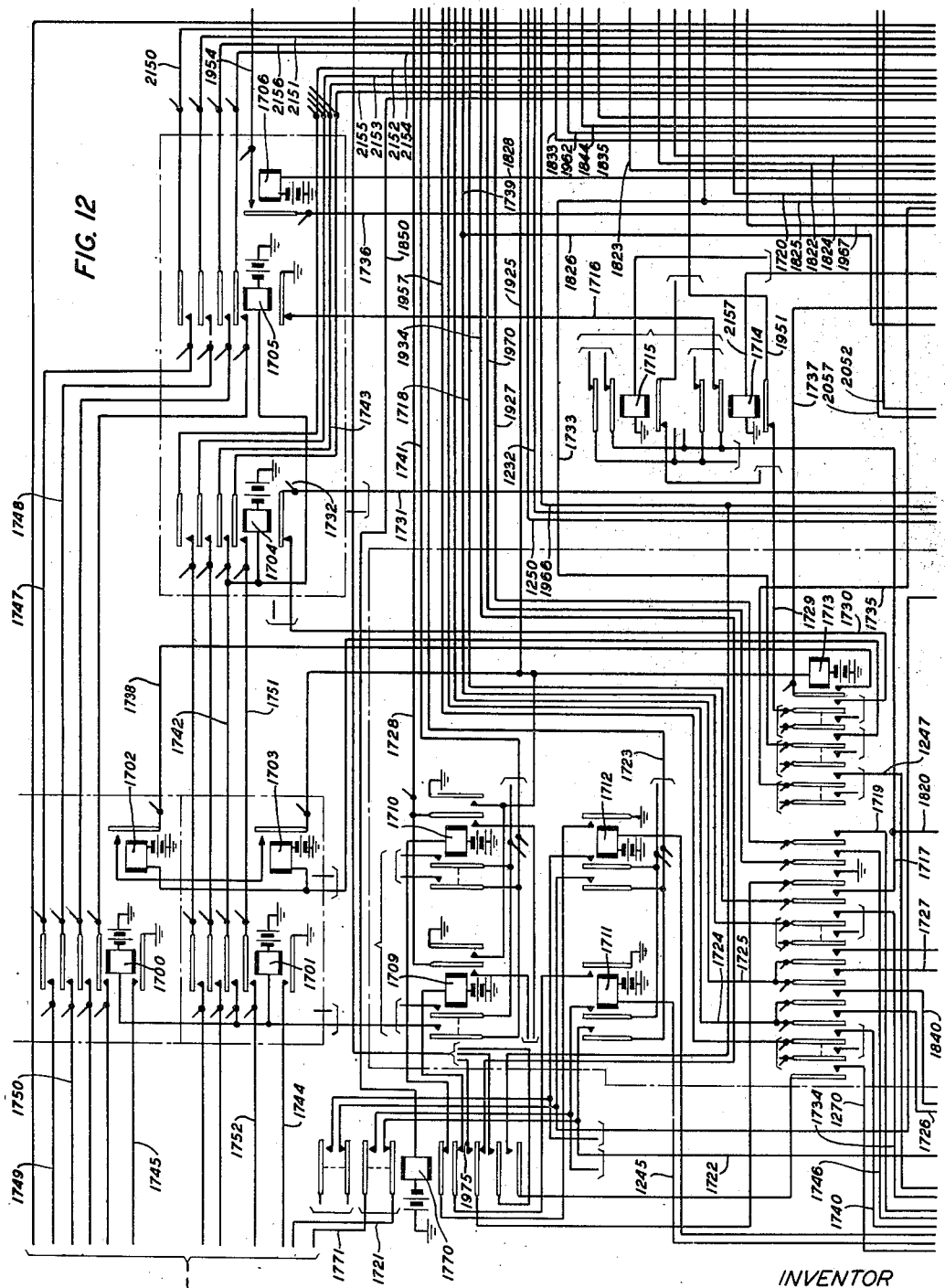
Figure 13:
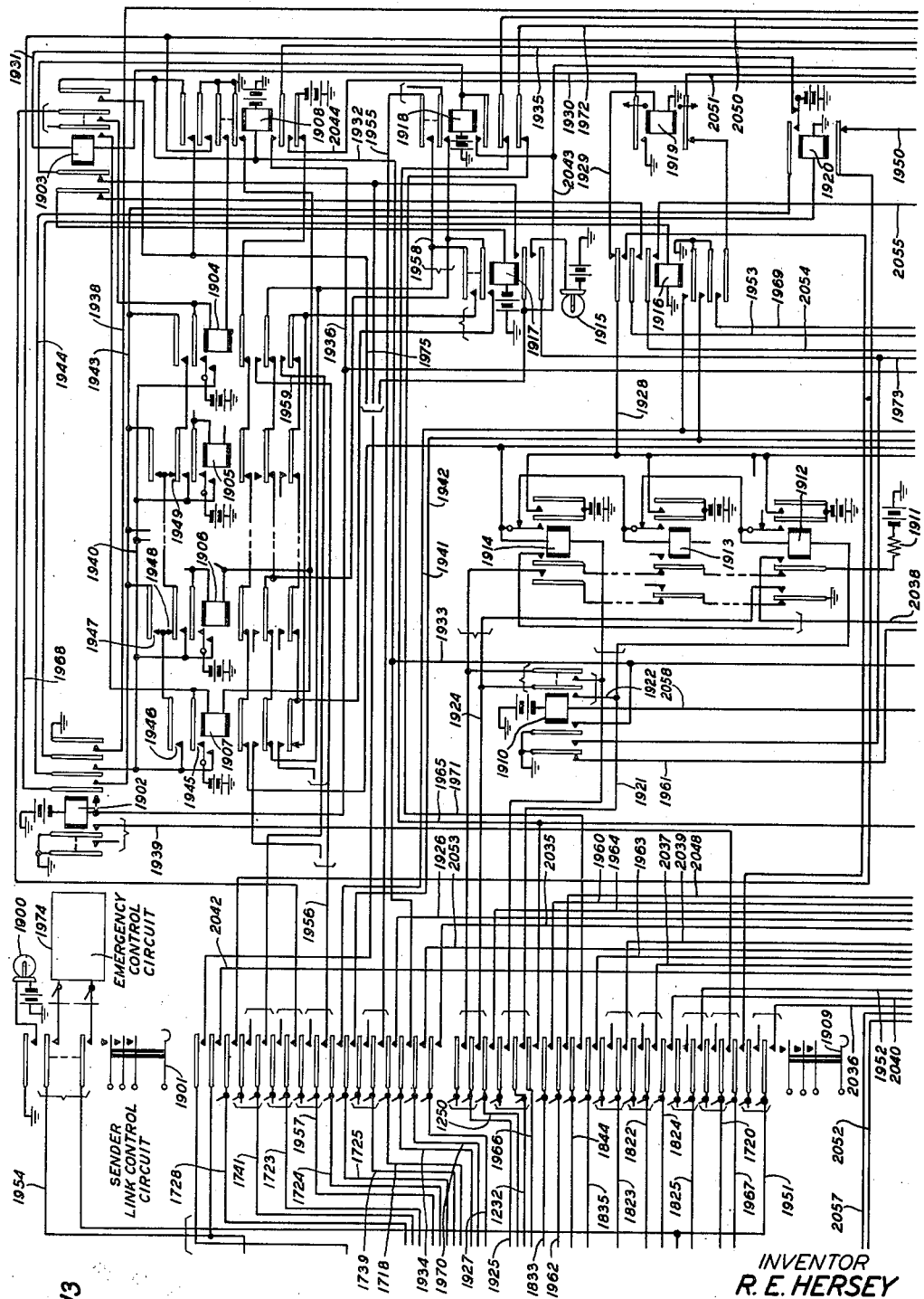
Figure 14:
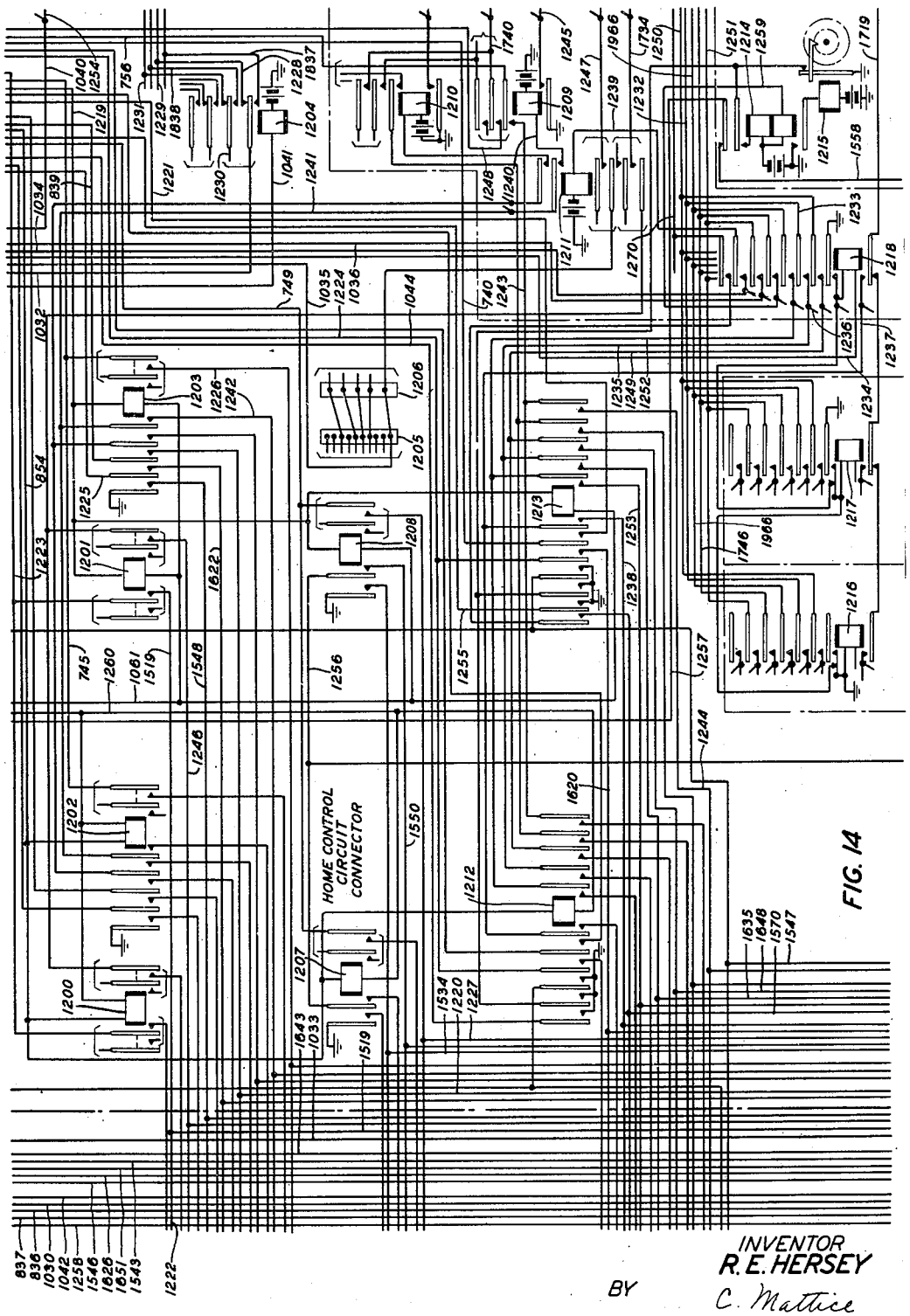
Figure 15:
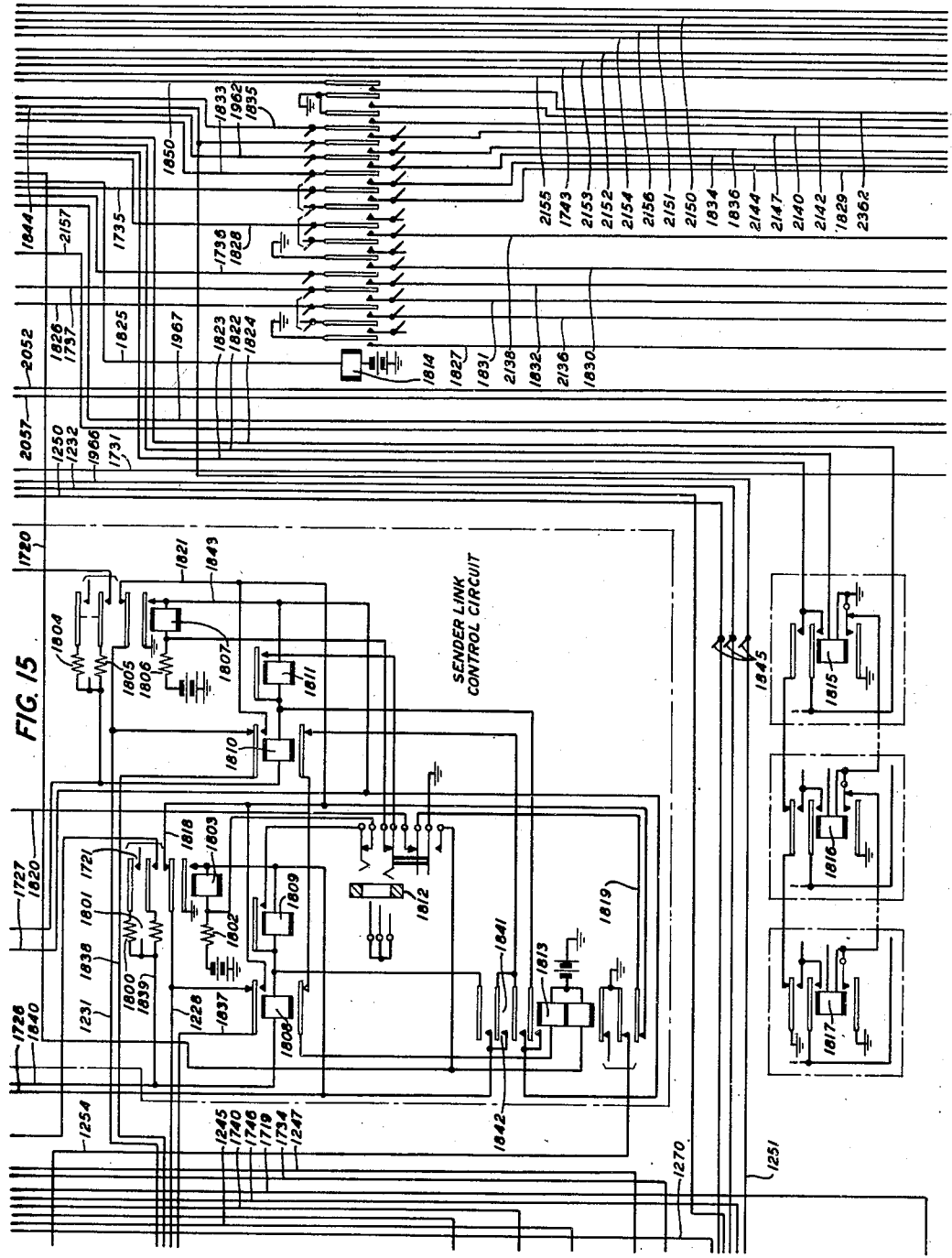
Figure 16:
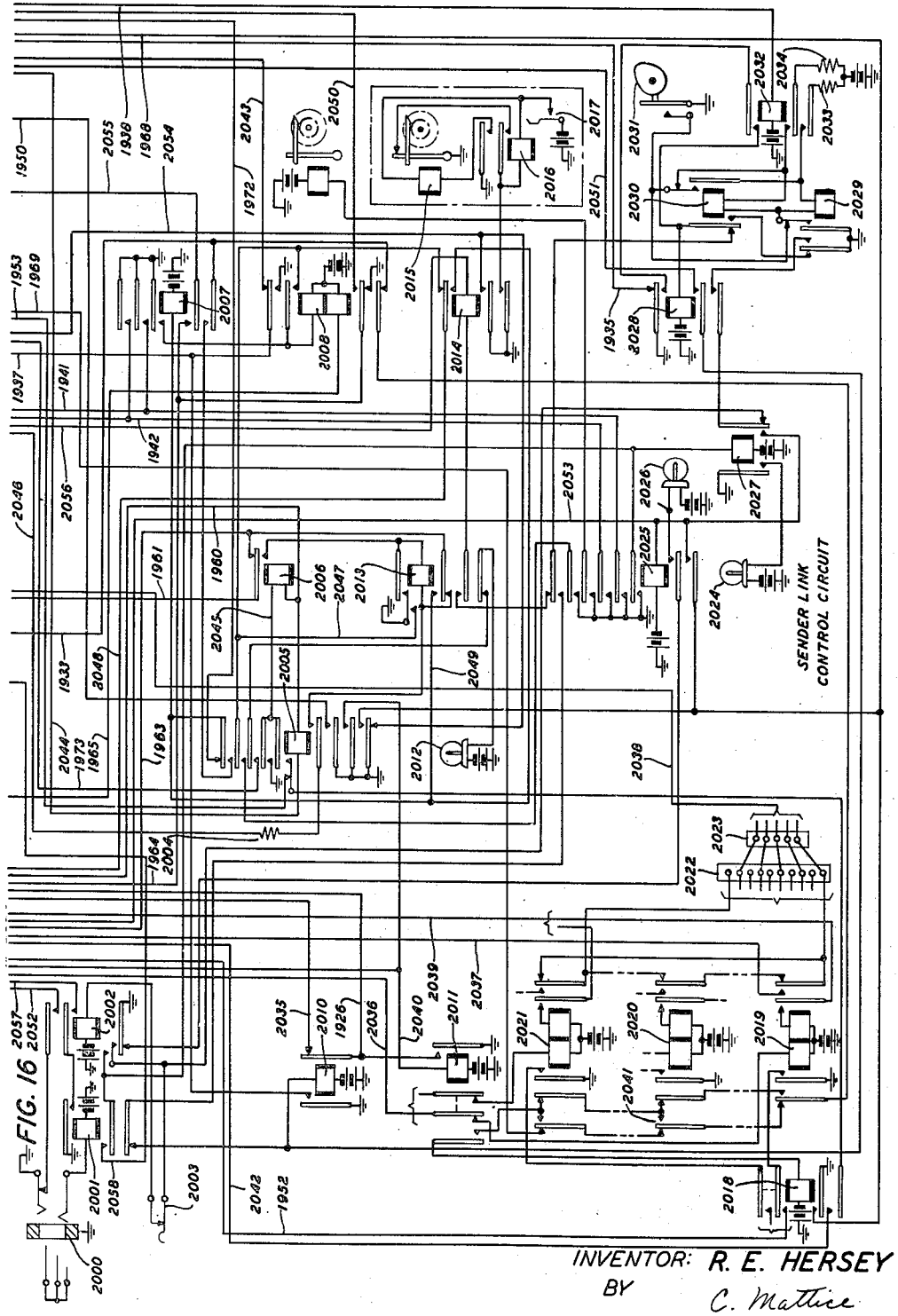

Fig. 8 showing a calling subscriber's line, a line link and the horizontal group circuit;

Fig. 9 showing parts of a district junctor circuit and a tandem trunk circuit, together with a schematic showing of terminating and tandem equipment;

Figs. 10, 11, 14, 17 and 20 showing the line link control circuit;

Figs. 12, 13, 15, 16 and 18 showing a sender link and the sender link control circuit;

Fig. 19 showing parts of a sender circuit; and

Fig. 21 shows the manner in which Figs. 8 to 20 inclusive, should be arranged for an understanding of the invention.

For convenience the present invention has been disclosed as applied to the line and sender links and control circuits as disclosed and claimed in United States Patent 2,224,251, granted December 10, 1940 to A. J. Busch and E. L. Erwin, and in general the same reference numerals have been used.

As described in the above-identified patent, the standard cross bar line switch arrangement employs primary line switches having ten sets of vertical contacts which are connected to subscribers' lines and ten sets of horizontal contacts which are connected to line links. The horizontal contacts may be multiplied together so that one set of ten line links may serve as many as seventy lines. The other ends of the line links are connected to horizontal contacts in the secondary line switches. District junctors are connected to the sets of vertical contacts in the secondary line switch.

In the preferred form of the present invention, a certain number of the sets of vertical contacts are connected to tandem trunks instead of to district junctors. In the establishment of a connection to a tandem trunk, the subscriber connects ground to the tip conductor in the manner described hereinafter. In response to the removal of the receiver or handset, the line is connected to an idle district junctor and idle sender in the manner described in the above-identified patent and as will be described hereinafter. The sender tests for this ground and, finding it present, prevents the connection of dial tone to the line and the locking of the sender to the line. The ground detecting means then releases the district junctor test relays, opens the district junctor test leads, closes the tandem trunk test leads and causes the district junctor test relays to test for an idle tandem trunk, after which the line is connected to the trunk and the link control circuits and sender are released.

In order to provide two-party message rate service, for both local and tandem calls, the local sender is arranged to test for a grounded tip conductor as soon as seized to determine whether a local or tandem connection is desired and again following the dialing of the first digit to determine which party is calling, and the substations are provided with special dial controlled means for applying the tip party ground. This will be apparent from the description of Figs. 1 to 7, inclusive.

Fig. 1 shows a stand or desk mounting 100 for a handset 101, shown in section. The handset controls a plunger 102 which acts upon a lever 103 mounted on a bracket 104. This lever is so formed as to control the usual switchhook contacts 105 as well as a cam 116 associated with the dial assembly. Seated in a recess in the face of the stand 100 is a casing 106 containing the dial mechanism. The shaft carrying the dial cams and the finger wheel 107 also carries an eccentric cam 108. A bracket 109, attached in any suitable manner to the stand 100 supports, insulatedly, a pair of spring contact members 110 and 111. Two means are shown for operating contact member 110 into engagement with member 111, one of which is tandem key 112, which is mounted by means of a plate 126 secured to the stand 100 adjacent the dial 106 and carries a stud 113 which has a camming action on spring 110. The second means is a follower 114, suitably pivoted on bracket 109, on which are arranged a roller 115 and a stud 117. Key 112 is of the well-known locking type, having a locking cam 127 which is arranged to lock under locking plate 128. This plate is resiliently attached to plate 126 and has a tripping arm 130, held in position by spring 131 anchored to an arm 129 of bracket 109. The cam member 116, previously mentioned, is slidably mounted on bracket 109 and has an arm 118 which extends under a latching member 119.

Figure 3:
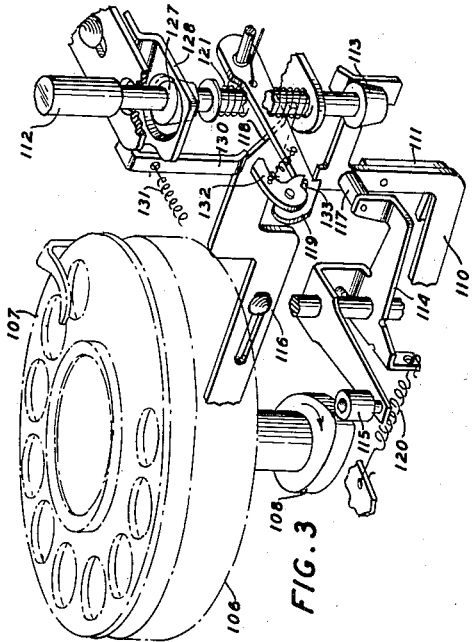
Figs. 2 and 3 show in detail the equipment associated with the subset of the tip party on a party line, Fig. 2 showing the equipment normal and Fig. 3 with the grounding contact locked.
Figure 2:
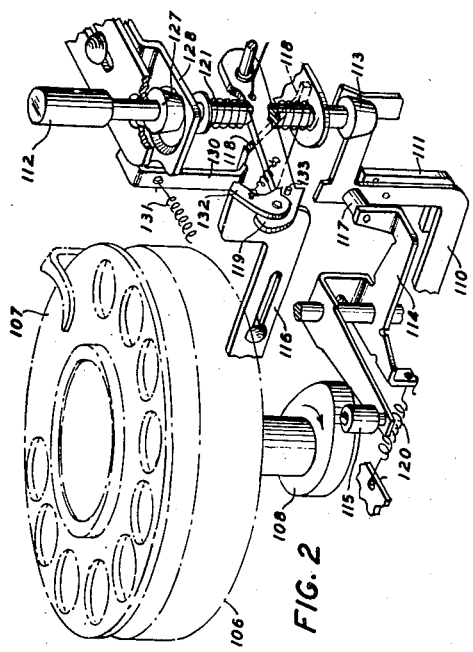

In order to more clearly indicate the manner in which the apparatus of Fig. 1 functions, reference may be made to Figs. 2, 3 and 6. With the handset in the cradle, cam 116 is pressed forward so that latch 119 is raised on the camming surface of arm 118, stud 117 is held back by the action of spring 120 on follower 114 and key 112 and stud 113 are held elevated by spring 121.

If the subscriber having this equipment wishes to make a local call he removes his handset and waits for dial tone. The removal of the handset permits cam 116 to be drawn back under the control of spring 122 (Fig. 1) to the position shown in Fig. 3. Latch 119 drops onto the top of spring 110 but is ineffective. As shown in Fig. 6, the release of cam 116 permits the closure of the switchhook contacts represented by contact 123, thereby establishing a direct current closure across the line conductors 124 and 125 to initiate the operation of the line link control circuit as described hereinafter. It is to be understood that the handset 101, dial 106 and contact 123 are intended to represent a conventional subscriber's substation, only the supplementary equipment being shown in detail.

When dial tone is heard, the subscriber operates the dial. As soon as the dial is moved off normal for the first digit, cam 108 rotates with the dial, acting through roller 115 and follower 114 to press stud 117 against spring 110. Spring 110, moving along the camming edge of latch 119 lifts that latch which drops behind the spring locking it in place, as shown in Fig. 3, in contact with spring 111 where it remains throughout the call. The effect of the closure of the contact between springs 110 and 111 is to connect ground through ringer 134 directly to the tip conductor 124 and through the subset to the ring conductor 125 to identify the calling substation as the tip party on a party line.

If the subscriber had desired to make a tandem call, he would have depressed key 112, before removing the receiver, whereupon key stud would have moved spring 110 into contact with spring 111. At the same time, locking cam 127 would pass through the opening in locking plate 128 and latch under it to hold the key in the position shown in Fig. 3. The removal of the receiver permits latch 119 to fall into the locking position. The operation of the dial causes cam 108 to move stud 117 against spring 110 but since that spring is already locked in place the dial is ineffective to operate the spring 110.

Following either type of call, the replacement of the handset 101 in the cradle advances cam 116 so that the camming surface on arm 118 lifts latch 119. If spring 110 is locked only by latch 119, it immediately returns to normal. If key 112 has also been locked, tongue 132 which is pivotally mounted on latch 119, presses against tripping arm 130 to move plate 128 off cam 127 and unlock key 112. Pin 133 limits the motion of tongue 132 to render it effective only during the lifting of latch 119.

Figure 5:
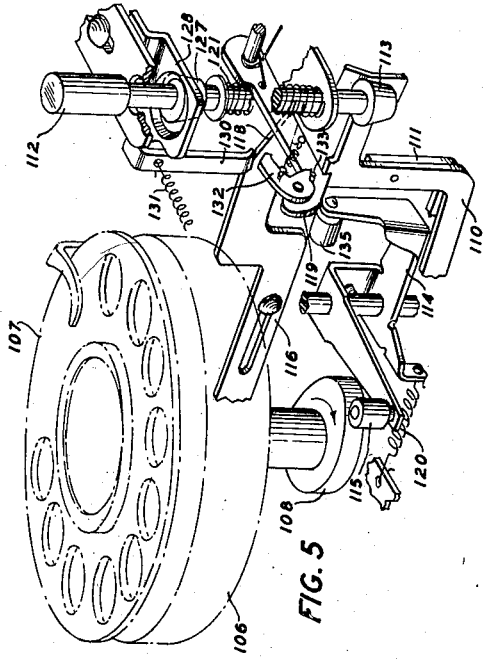
Figs. 4 and 5 show in detail the equipment associated with the subset of the ring party on a party line, Fig. 4 showing the equipment normal and Fig. 5 with the grounding cam locked.
Figure 4:
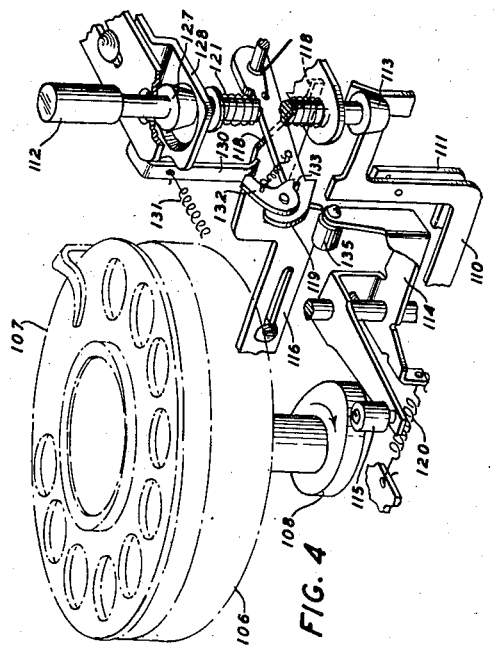

Figs. 4, 5 and 7 show the equipment at the substation of a ring party on a party line. The equipment is substantially the same as that shown for the tip party, except that the follower 114 carries, in place of the stud 117, a longer arm on which is mounted a roller 135. The action in response to removing the handset is the same as for the tip party. When the tandem key is operated the contact between springs 110 and 111 is closed and locked as described. In this case, however, when the subscriber dials, the cam 108, acting through follower 114 on roller 135, lifts latch 119 restoring tandem key 112 and the spring 110. Therefore there is no ground on the line conductors 124 and 125 when the sender makes its second test following the dialing of the first digit. In the case of a local call, the action of the dial cam 108 causes roller 135 to lift latch 119 at each turn of the dial, but since the spring 110 has not been operated, the action is ineffective.

The foregoing description of the equipment at the subscribers' substations will clarify the operation of the circuits as now traced.

*Start of originating call*

When the subscriber at substation 700 which may be assumed to be the same as that shown in Fig. 6 initiates a local call, the removal of the receiver from the switchhook operates line relay 706 over a circuit from battery, through the winding of relay 706, outer break contact of hold magnet 704, through the substation circuit, inner break contact of magnet 704 to ground. Relay 706 in operating serves to seize the line link control circuit and to identify the calling line to the control circuit. To this end, relay 706 grounds individual lead 724 and common start lead 725. The start circuit closed over conductor 725 may be traced from ground over the armature and make contact of relay 706, conductor 725, left-hand contacts of relay 710 to a junction point on conductor 727; thence over one branch through a break contact of relay 710, conductor 728, right outer break contact of gate relay 723, conductor 729, to the winding of start relay 720; and over the other branch through a break contact of relay 710, conductor 730, right outer break contact of gate relay 719, conductor 731 to the winding of start relay 716.

Relay 720 energizes the master start relay 805 in a circuit extending from battery on a break contact of relay 1015, conductor 813, winding of relay 805, conductor 814, right outer break contacts of relay 804, conductor 815, contact of relay 807, conductor 816, contact of a relay in the mate frame circuit, not shown, conductor 913, break contact of jack 1005, conductor 1022, right inner make contact of relay 720, conductor 732, break contact 864 of relay 806, conductor 819, break contact of continuity springs 861 on relay 812, conductor 820, break contact of relay 1015, break contact of key 1013, to ground. Similarly, relay 716 energizes relay 804. Relay 804, however, is made slow operating so that, although it is energized at the same instant as relay 805, its operation will under normal conditions be prevented by the speedier movement of the latter relay. Relay 805 locks to conductor 815 independent of relay 804 and the mate control circuit and operates relay 810. The circuit for relay 810 extends from battery on conductor 813, winding of relay 810, conductor 830, through the mate frame circuit to conductor 916, left outer make contact of relay 805, conductor 833, left inner break contact of relay 808, conductors 817 and 816 to ground as above traced.

Figure 17:
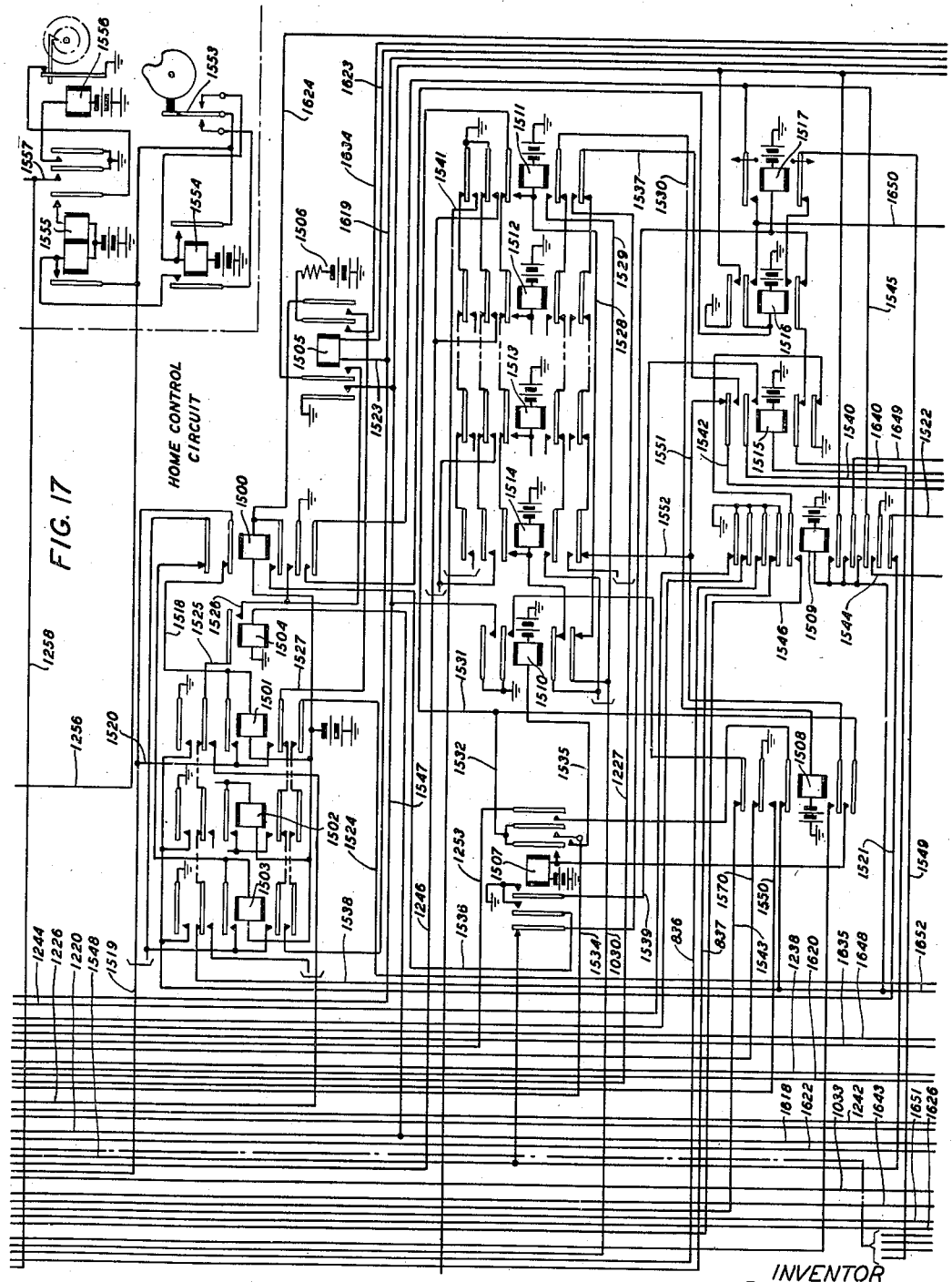
Figure 18:
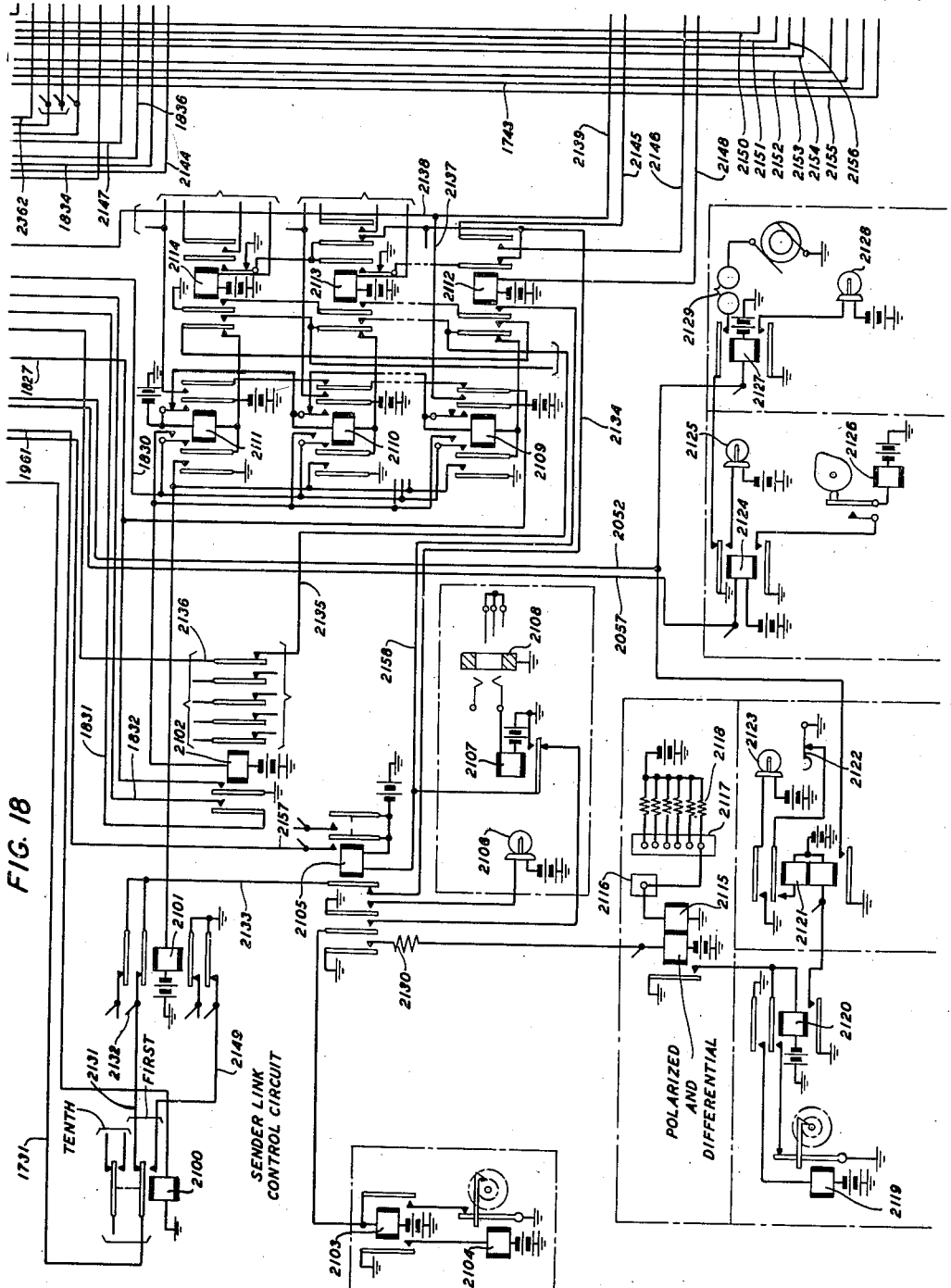

Relay 810 operates the control connector relays to bring into use the link control circuit of Figs. 17 and 20. Control connector relay 1021 operates in a circuit from battery at a break contact of relay 1015, over conductor 1026, winding of relay 1021, conductor 1027, a right front contact of relay 810, conductor 836, to ground at a break contact of release relay 1509 in the control circuit. Relay 1021 locks itself with ground from its own front contact, over conductor 1022, make contacts of relay 810 in series, conductor 1027, back to its own winding. Control connector relays 1201, 1203, 1208 and 1213 also operate and lock under the control of relay 810.

Control connector relay 1021 operates gate relay 723 in a circuit from battery, winding of relay 723, conductor 734, to ground at a make contact of relay 1021. Relay 723 locks over conductor 735 to ground at a make contact of relay 805, and opens the operating paths of the start relays 720, etc., but the start relay 720 remains locked to the start lead independent of relay 723. With relay 1203 operated, a supplementary locking path for relay 720 is provided over conductor 736, break contact of relay 808, conductor 839, make contact of relay 1203, conductor 1220 to ground through the winding of relay 1504 and also to direct ground over conductor 1618 and the lower break contact of relay 1614.

The horizontal group relay 709 corresponding to the preferred start relay 720 is now operated from ground supplied by relay 723. This circuit may be traced from battery, winding of horizontal group relay 709, conductor 737, left outer make contact of relay 720, conductor 740, a make contact of relay 1213, conductor 1221, left outer break contact of relay 808, conductor 741, left outer make contact of relay 723, to ground. The ten line links accessible to the horizontal group represented by relay 709 are now put in readiness by the operation of their secondary select magnets. Relay 709 closes these paths, one of which may be traced from battery, winding of line link secondary select magnets 712, and 714 in parallel, conductor 757, make contact of relay 709, conductor 758, to ground at the break contact of the make-busy jack 801. Also various individual leads pertaining to the horizontal group are connected through the make springs of relay 709 to corresponding common leads.

In this way, the seven start leads 725, etc., associated respectively with the seven ten-line groups composing the maximum horizontal group, are connected over a corresponding number of common leads, through the control connector relays to the control circuit, and so to the windings, respectively, of the seven chain relays represented by relays 1501, 1502 and 1503. These seven relays serve to make a record of whatever ones of the seven ten-line groups are attempting to originate calls at the moment, and by their chain arrangement give preference to the lowest numbered group. All seven of the relays 1501, etc., operate initially, since the seven start leads 725, etc., are, for the time being, tied together at break contacts of relay 710. The path for operating relay 1501 may be traced from battery, winding of relay 1501, conductor 1519, upper inner break contact of relay 1509, conductor 1519, left inner make contact of control connector relay 1201, conductor 1223, a make contact of relay 709, conductor 742, start lead 725, to ground at the left make contact of line relay 706. All other relays of the chain such as 1502, etc., operate over a similar path, through the left break contacts of relay 710 and the multiple point on lead 727, to start lead 725.

Relays 1501, etc. each close a path from ground, through their upper outer make contacts, conductor 1521, bottom outer break springs of relay 1509, conductor 1522, to the winding of relay 1613, and battery, operating that relay. Relay 1613 completes a path for operating relay 1614 in a series circuit carried through make contacts of the seven relays 1501, etc. so as to check the operation of the latter relays. This circuit may be traced from battery through the winding of relay 1614, conductor 1619, outer lower make contacts of relays 1503, 1502, 1501, etc., conductor 1524, make contact of relay 1613, conductor 1629, make contact of relay 1213, conductor 1224, make contact of relay 709, conductor 727, break contact of relay 710 to ground on start conductor 725. Relay 1614 in operating removes ground from conductor 1618 to open the shunt around relay 1504, grounds a path for operating relay 710, and closes a locking path for itself in series with relay 1505. Relay 1505 remains normal for the moment, since its winding is shunted by the ground present on conductor 1619.

Relay 710 upon operating opens the operating paths for relays 716 and 720, restoring the former and leaving the latter locked in series with relay 1504. Relay 1504 with its second shunt removed in this manner, now operates in series with relay 720. Relay 710 also separates the seven start leads from each other, thus removing ground from the start leads of all non-calling tens-groups and restoring the corresponding chain relays 1501, etc. The chain relays corresponding to calling tens-groups remain operated, and they lock themselves in obvious manner around the break contacts of relay 1500 through which their respective operating circuits pass. Relay 710 also removes ground from the operating circuit of relay 1614. The shunt is thus removed from around relay 1505, which now operates in the locking circuit of relay 1614. Relay 1505 closes the circuit for operating gate relay 1500, in a path extending from battery, winding of relay 1500, right outer make contact of relay 1505, conductor 1527, make contacts of relay 1501 to the start ground used for operating relay 1501.

Selection of the tens-group first to be served is governed by the series wiring on chain relays 1501, etc. Preference is given to the lowest numbered group and the selection is completed by operating the corresponding line connector relays 707 and 708, a pair of which are furnished for each tens-group in the horizontal group. The operating circuit for this pair of relays is closed by relay 1500, the path being traced from battery, windings of relays 707 and 708 in parallel, conductor 744, a make contact of relay 709, lead 745, right make contact of relay 1203, conductor 1226, make contact of upper transfer springs on relays 1501, etc., the chain circuit wired through these transfer springs, conductor 1525, make contact of relay 1504, conductor 1526, lower middle make contact of relay 1500 to ground.

Connection is thus established between the selected tens-group and the control circuit in preparation for the next step, namely that of recording the calling lines in the group and of selecting the line to be served. Relay 708 connects the individual contacts of the ten line relays 706 over make contacts of connector relay 1021 and break contacts of gate relay 1510 to the windings, respectively, of the ten control circuit relays represented by 1511, 1512, etc. As many of the ten relays 1511, etc. operate as there are lines calling, and the lowest numbered relay in the group operates relay 1508 in a circuit from battery, winding of relay 1508, conductor 1530, lower inner series chain circuit and make contact of relay 1511, etc., conductor 1529, to conductor 1030 and ground over the operating circuit of relay 1511. Relay 1508 closes the operating circuit of relay 1507 from ground on the conductor 1030 used in operating relay 1511, etc., locking contact of relay 1511, upper inner series chain, conductor 1531, lower outer make contact of relay 1508, winding of relay 1507, to battery. Relay 1507 locks itself through its right inner make contact and its right middle make contact, conductor 1534, left outer make contact of relay 1208, to ground. This locking ground for relay 1507 is passed back over conductors 1532 and 1531 to lock relay 1511 and the same ground is also carried through the right middle double make contact of relay 1507, over conductor 1535, winding of relay 1510 to battery, operating the latter relay. Relay 1510 serves to release all relays in the group of higher number than the relay locked as already described. The selection of the line to be served has now been accomplished, since this line is the one whose hold magnet derives its energizing path from the only one of the chain relays 1511, etc. left operated.

Relay 1507 connects ground from its left middle make contact over conductor 1536 to lock relay 1500 and the operated chain relay 1501, etc. At this time the calling line ceases to control disconnection of the link control circuit.

*District group test and selection*

While the operations of selecting, recording and connecting to the calling line are still under way, steps are taken to select a group of ten district incoming junctors which are accessible to the line link. The line link control circuit first makes an availability test on the basis of groups of ten district junctors, to determine how many such groups: (a) contain each at least two idle district junctors, (b) have their sender link control circuit available at the moment, (c) have at least one path available from the calling line through line link, district junctor, and sender link, to a sender group containing an idle sender. District junctor groups not meeting all these requirements are disregarded at this time. The line link circuit signifies a preference for one of the available ten-junctor groups by operating a lock-out relay corresponding to the twenty-junctor group which contains the preferred ten-junctor group. This lock-out relay excludes other line link control circuits and connects the line link control circuit in question to a portion of the common control leads which are associated with the twenty-junctor group and which, on the one hand, are multiplied throughout all line link frames served by that twenty-junctor group, and on the other hand, terminate at the sender link frame where the junctor group terminates. Over these leads a signal is passed to the sender link control circuit telling it that a call is waiting on the twenty-junctor group, and this group receives service if it is in preferential relation to other twenty-junctor groups which may at the same moment be attempting to place calls from other line link frames. A signal of acceptance is then returned from the sender link over the common leads above-mentioned, to the line link control circuit. The line link control circuit thereupon definitely selects the twenty-junctor group and next, the particular ten-junctor group to be used, employing for this purpose certain connector relays to establish connection with additional ones of the common control leads associated with the twenty-junctor group. The choice as to the ten-junctor group is signaled from the line link control circuit to the sender link control circuit, and the latter circuit proceeds to select the individual district junctor, sender link, and sender, as will be described later.

The test for availability of paths begins with the operation of relay 709, since this relay closes test paths from the sleeves of the ten line links to the windings of the ten relays represented by relays 1615 and 1616. One such path may be traced from battery, winding of relay 1615, conductor 1626, a make contact of relay 1021, conductor 1031, upper lever spring and break contact of jack 801, conductor 841, make contact of relay 709, conductor 750 to sleeve conductor 751. The sleeve conductors are held busy by connection to ground, as will be explained, so that the presence of ground on the sleeve will operate the corresponding relay 1615, etc., and the latter relay by opening the operating paths of its associated relay 1609, etc., will indicate that the line link is engaged. Available line links will be indicated by normal relays 1615, etc.

The next step in the test is taken during registration of the tens-group containing the calling line, when relays 1613 and 1614 operate. These relays close the operating paths for the ten test relays represented by relays 1609, 1610, etc. Each of these latter relays corresponds to a group of ten district junctors, and the five pairs of relays such as 1609 and 1610, 1611 and 1612, etc. correspond to the five groups of twenty district junctors which respectively extend, under ordinary wiring arrangements, to five different district link frames and their associated sender link frames. The operating path for relay 1609 runs from battery, through the winding of relay 1609, by way of conductor 1627, upper inner make contact of relay 1613, conductor 1628, upper break contact of relay 1615, conductor 1629, upper inner break contact of relay 1617, conductor 1630, a make contact of relay 1021, conductor 1032, upper inner break contact of relay 1204, common conductor 1228, upper break contact of relay 1803, conductor 1818, lower outer break contact of relay 1813, conductor 1819, lower outer break contact of jack 1812, conductor 1820, upper inner break contact of relay 1714, conductor 1716, break contact of sender link hold magnet 1705 to ground.

As pointed out in the previously-identified Busch et al. patent, the operation of relay 1609 indicates (a) that for the corresponding group of ten district junctors the sender link providing access to that group is available for use, (b) that the group of ten district junctors in question contains at least two junctors available for use, (c) that the sender link is available for use (d) that for the group of ten district junctors in question at least one sender link path is available and (e) that the group of senders to which this link path connects is non-busy or in other words, has at least one of its senders available.

Having determined through the operation of relays 1609, 1610, etc., which groups of ten district junctors are able to serve the call, the line link control circuit expresses a preference by operating lock-out relay 1218. The energizing path for relay 1218 may be traced from ground, over a chain circuit involving the upper break contacts of relays 1216 and 1217, respectively, winding of relay 1218, conductor 1234, a make contact of relay 1021, conductor 1033, make contact of left middle transfer springs on relay 1609, assumed operated, conductor 1631, break contact of left middle transfer springs on relay 1612, conductor 1632, jumper between cross-connection blocks 1608 and 1604, conductor 1633, lower break contact on relay 1603, conductor 1634, right inner make contact on relay 1505, resistance 1506 to battery. Relays 1218, etc., not only act as lock-out relays, but they serve also as connector relays to connect their respective line link frames to some of the common control leads pertaining to the twenty-district group.

With the operation of relay 1218, the line link frame is able to signal over the common control leads to the sender link frame and demand service on the twenty-district junctor group. Relay 1613 connects ground from its lower outer armature and front contact, over conductor 1635, make contact on relay 1213, conductor 1235, contact of relay 1218, multiple strap 1233, conductor 1232, make contact of key 1909, normally operated, conductor 1921, winding of start relay 1912, series chain through continuity contacts of relays 1913 and 1914, series chain through lower inner break springs of relays 1907, 1906, 1905 and 1904, to battery at the bottom break springs of relay 1908. The start relays represented by relays 1912, 1913 and 1914 are five in number, one each for the five groups of twenty district junctors served by the sender link frame. Assuming relay 1912 to be the preferred relay it locks to battery on its right inner make springs and closes ground from its left outer armature and make contact, over conductor 1924, a contact of key 1909, normally operated, conductor 1925, winding of relay 1713, to battery.

Having granted preference to a particular group of twenty district junctors, the sender link circuit signals accordingly to the line link circuit attached to that district junctor group. The ground used for this purpose is the paths available ground already traced which extends to conductor 1820, thence by conductor 1717, through a make contact of relay 1713, over conductor 1718, a contact of key 1909, conductor 1926, break contact of relay 2010, conductor 2035, a make contact of key 1909, conductor 1927, a make contact of relay 1713, conductor 1719, lower armature and make contact of relay 1218, conductor 1237, make contact of relay 1213, conductor 1238, lower outer armature and break spring of relay 1603, conductor 1637, the jumper between the terminal blocks 1604 and 1608, conductor 1638, chain circuit on right inner armature and break contact of relay 1612, conductor 1639, to the lock armature and winding of relay 1609, and battery. From conductor 1238 a branch conductor 1636 carries ground to the winding of relay 1617, and battery. Relay 1609 locks operated, while relay 1617 operates and opens the operating paths of all of the relays 1609, 1610, etc., thus restoring all except the locked one. Relay 1617 connects ground from its lower make contact over conductor 1640, winding of relay 1515, to battery, operating the latter relay. Relay 1515 closes a circuit from ground at the left inner make contact of relay 1507, conductor 1539, upper inner make contact of relay 1515, conductor 1540, lower inner armature and break contact of relay 1603, conductor 1641, cross-connection between terminal blocks 1604 and 1608, to the chain circuit at the left outer transfer springs of relay 1612, conductor 1642, left outer armature and make contact of relay 1609, conductor 1643, a make contact of relay 1021, conductor 1034, upper make contact of relay 1218, conductor 1239, winding of relay 1211, and battery. Relay 1211, like relay 1218, is representative of the preferred group of twenty district junctors and its operation completes the process of selecting the twenty-group. Relay 1211 also closes additional control leads for the selected junctor group, and completes the operating paths for relays 1209 and 1210, which represent respectively the first and second ten district junctors in the twenty-group. Relay 1209 will be the one to operate, since it is assumed that the first one in the pair of test relays 1609 and 1610 is locked operated.

Relay 1209 now operates the primary select magnets of the line link, since the choice of the district tens-group determines the terminating or secondary end of the line link, the circuit for primary select magnet 705 extending from battery through the winding of that magnet, make contact of relay 709, conductor 756, upper inner make contact of relay 1209, conductor 1243, a make contact of relay 1213, conductor 1244 to ground at a break contact of release relay 1509. Relay 1209 also notifies the sender link as to the choice of the district tens-group, with ground from its lower make contact, common control lead 1245, winding of relay 1711 and battery, operating relay 1711. Relay 1711 operates relay 1709 in a circuit over a break contact of relay 1770 and prepares paths for making a busy test of the individual districts composing the tens-group. Relay 1709 prepares the operating circuits for the ten pairs of primary hold magnets, such as 1700 and 1701, which give access from the ten district junctors to the corresponding ten sender links.

When the start relay 1912 operated it closed a circuit to operate relay 1919 which in turn operates relay 1903. Meanwhile relay 1908 operates in a path from battery, winding of relay 1908, conductor 1932, a make contact of key 1909, conductor 1934, break contact of relay 1770, to ground at a make contact of relay 1713. Relay 1908 grounds the off-normal ground lead 1968, supplies ground for operating relays 1904, etc., and operates relay 1902. Relay 1908 also removes battery from its lower break contact in order to open the operating circuit of the start relay 1912. Relay 1902 upon operating locks to the off-normal ground lead 1968, grounds conductor 1938 to operate relay 2032 and start the timing circuit, and operates all five of the district group busy relays such as 1813, to make the corresponding twenty-district junctor group test busy to all its associated line link frames.

District junctor test

With the operation of relay 1711 above-mentioned, the individual district junctors are tested. Each group also includes a plurality of tandem trunks but with relay 1770 normal, only the test leads such as 1721 coming from the district junctor circuits over break contacts of relay 1770 are connected respectively through the windings of the corresponding ones of the ten test relays represented by 1904, 1905, etc. to ground. The test lead of a busy district junctor is opened, while that of an idle district junctor is connected through a resistance to battery, so that idle districts will be indicated by operated test relays 1904, 1905, etc. Taking relay 1904 as an example, its operating path may be traced from ground at a make contact of relay 1908, winding of relay 1904, right outer make contact of relay 1903, a make contact on key 1909, conductor 1723, left outer make contact of relay 1711, inner upper break contact of relay 1770, conductor 1721, to the district junctor circuit, break contact of make busy jack 2212, conductor 2214, lower outer break contact of relay 2207, upper outer break contact of relay 2203, resistance 2201, to battery. The operated test relays, having locked themselves in local circuit to battery on their upper inner make contacts, connect battery to conductor 1940 and through a make contact of relay 1902 to the winding of relay 1916 and ground, operating the relay. Relay 1916 at its upper outer make contacts, connects battery from conductor 1928, through a make contact of key 1909, conductor 1967, to ground through the winding of relay 2100 operating that relay for a purpose to be explained later.

Sender selection

While the district tens-group is being selected and the test for idle districts is under way, the sender link control circuit proceeds to test the sender groups for available senders, and next to select a sender group and an individual sender to serve the call.

Test relays represented by 2019, etc. in the sender link control circuit, test respectively the sender groups serving the sender link frame, to determine how many of the sender link paths accessible to the selected district group will each meet the following requirements: (a) that the sender link itself is idle, (b) that the associated sender group is not being selected at the moment by some other sender link frame, (c) that the sender group is not entirely busy and (d) that the sender group contains more than one idle sender. Sender groups containing only one idle sender apiece are disregarded at this time. Taking test relay 2019 as an example, its operating path runs from battery, winding of relay 2019, left outer break contact of relay 2011, conductor 2036, a contact of key 1909, conductor 1951, lower break contact of relay 1714, common conductor 1729 to an armature and make contact on relay 1713 corresponding to the selected district group, individual lead 1730 corresponding to the first sender link for that district group, break contact of secondary hold magnet 1704 of the sender link referred to, common conductor 1731 relating to the sender group serving the sender link in question, inner transfer armature and break spring of relay 2100, common conductor 2131, break contact of relay 2101 to conductor 2133, left inner break contact of relay 2105, conductor 2134, to ground at the right inner chain contacts of relays 2112, 2113, etc. It may be explained that the sender group busy relay 1714, etc. operate and correspondingly open the test paths whenever all senders in the group become busy, while the relays represented by 2112, 2113, etc. are ten in number, one each for the individual senders composing the group, and each relay is operated when its corresponding sender becomes busy. The right inner contacts of these relays are arranged in chains to indicate by a ground on test lead 2134 whether or not the group contains at least two idle senders.

The operation of any one of the test relays 2019, etc. indicates that for the district junctor group carrying the call there is a path available over a particular sender link to a sender group containing at least two idle senders, and furthermore that the sender group at the moment is free to accept the call. After testing in this manner, the control circuit selects one of the sender groups by operating the lock-out relay such as 1815 corresponding to that sender group. The operating path for relay 1815 may be traced from ground, through the winding of relay 1815, conductor 1822, contact of key 1909, conductor 2037, right make contact of relay 2019, through connecting blocks 2022 and 2023, conductor 2038, left inner make contact of relay 1912, to battery through resistance 1911. Relay 1815 at its bottom chain circuit opens the operating path of other relays in the group to exclude other link frames, and at its upper outer make contact closes a locking circuit for the corresponding test relay such as 2019. Relay 1815 also connects ground through its upper inner make contacts to lead 1824, through a contact of key 1909, conductor 2040, to the winding of relay 2011 and battery, operating relay 2011. Relay 2011 is a gate relay whose operation opens the energizing paths of all the test relays 2019, etc. to release all except the locked one. Relay 2011 also at its right make contact supplements the ground on the paths available lead 1926, so that if the last path available is being used to serve the call the subsequent opening of the path available lead 1926 will be unable to remove ground from lead 2035 and thus dismiss the line link. Relay 2011 furthermore closes one section of the energizing path for relay 2018, which may be traced from battery, winding of relay 2018, left outer make contact of relay 2011, left middle break contacts of the normal relays 2021, 2020, etc., left outer make contact of relay 2019, lower outer break contact of relay 2008, to conductor 1933 and a path already traced to ground at a make contact of relay 1713.

With the operation of relay 2018, connection is made to the selected sender group circuit by way of connector relay 1814. The operating path for relay 1814 may be traced from battery, winding of relay 1814, conductor 1825, key 1903, conductor 1952, upper inner make contact of relay 2018, left inner make contact of relay 2019, to ground.

The same ground supplied by relay 2018 to conductor 1825 for operating relay 1814 is passed back over branch conductor 1733, through a make contact of relay 1713, to operate a pair of select magnets 1703 and 1702 at the primary end of the sender link to be used.

With connection established by way of connector relay 1814 to the chosen sender group, selection is made from among the idle senders in the group. Relays 2112, 2113, etc. represent ten relays which serve as busy relays respectively for the ten senders in the group, each relay being operated when its corresponding sender is busy. Furnished also for each sender is a selection relay 2109, etc., the ten such relays being connected in the usual chain arrangement so as to select their respective senders according to a certain order of preference. A preference chain is also provided on the contacts of the ten busy relays 2112, etc. for controlling the operation of the selection relays 2109, etc.

Assuming the first sender to be among those idle at the moment and ground to be present on preference lead 2135 due to the operation of relay 1511, then the busy relay 2112 is normal and relay 2109 receives preference and operates to select the first sender. In detail, the assumed operating path extends from battery at the right inner break contacts of relay 2111, the chain circuit through the right inner break contacts of intermediate relays 2110, etc., winding of relay 2109, left outer break contact of relay 2112, lead 2135, right outer break contact of relay 2102, conductor 2136, a make contact of relay 1814, conductor 1826, a make contact of relay 1713, common control lead 1734 for the selected twenty-district group to the line link circuit, a make contact of relay 1211, make contact of relay 1201, conductor 1246, chain circuit on upper middle contacts of relays 1512 and 1511, make contact of relay 1511, to ground.

The sender selector relay 2109 having operated to the lead 2135 locks itself to battery, and at its right outer chain contacts closes a branching ground circuit to select its corresponding sender. The ground is supplied from a make contact of relay 1814, over lead 1827, and after passing through the right outer front contact of relay 2109 to conductor 2137, it is fed over branch conductor 2138, make contact of relay 1814, conductor 1828, winding of secondary select magnet 1706 to battery, operating the select magnet. The starting of the sender by relay 2109 is accomplished with ground supplied from relay 2109 to conductor 2137, as already described, thence by way of branch conductor 2139 to the sender, and the windings of sender relays 2300 and 2301, operating these relays.

The sender now records the class of service characterizing the subscriber's line, such as individual message rate, two-party message rate, coin, etc. and also makes a record of the district link frame, so that later the information can be used by the decoder marker in operating the district frame connector.

While the sender is occupied with the registration explained above, preparations are made for operating the primary hold magnets of the selected sender link. Relay 2109 at its left outer make contact closes ground to operate relay 2101, which opens the test path associated with the sender group and makes the latter test busy at other sender link frames served by it. Ground from a make contact of relay 1814 is supplied over conductor 1830 to the left inner double make contacts of the sender selector relays 2109, etc. and this ground is used to lock up the operated relay 2109 and to energize relay 2102. Relay 2102, having first opened all five of the leads 2136 etc., one of which has been used for operating the sender selector relay, then connects conductor 1831 to conductor 1832 to operate relay 1917 in the control circuit. The operating path for relay 1917 runs from battery, through the winding of relay 1917, left outer break contact of relay 1903, upper middle make contact of relay 1916, conductor 1953, upper inner break contact of relay 2005, lower outer make contact of relay 2018, conductor 2042, a make contact of key 1909, conductor 1954, make contact of the operated select magnet 1706 at the secondary end of the selected sender link, conductor 1736, a make contact of relay 1814, conductor 1832, left outer make contact of relay 2102, conductor 1831, a make contact of relay 1814, conductor 1737, make contact of relay 1713, contacts, in series, of select magnets 1702 and 1703 at the primary end of the selected sender link, conductor 1925 and ground at the right outer make contact of relay 1709. Relay 1917 cannot operate and prepare the energizing path for any hold magnet until after the select magnets at both ends of the sender link have closed their make contacts and therefore have had opportunity to position their select fingers. The line link select magnets have previously been operated, as described, so that now both frames are ready to have their cross-points closed.

Relay 1917 in operating prepares the energizing paths for the primary hold magnets of the sender link, and operates relay 1918. The operating circuit of the latter relay traces from battery through the winding of relay 1918, left inner break contact of relay 1903, lower inner make contact of relay 1917, conductor 2043, upper outer break contact of relay 2008, conductor 1937, lock contact of relay 1902, to off-normal ground. Relay 1918 locks itself to conductor 2043 and energizes simultaneously both the secondary hold magnet of the line link and the primary hold magnet of the sender link. The ground used for operating these hold magnets is the one which has been used already in selecting a sender. Without retracing this lead from its source, the lead will be found entering the sender link circuit as conductor 1734, thence through a make contact of relay 1713, conductor 1826 and the branch 1739, a make contact of relay 1909, conductor 1955, upper outer contact of relay 1918, to branching conductor 1958. One branch feeds ground directly to the lower middle chain circuit of relay 1904 and through the make contact, assuming this relay to be operated, thence by conductor 1956, a make contact of key 1909, conductor 1957, make contact of relay 1713, conductor 1740, to the line link circuit and the upper middle make contact of relay 1209, conductor 1248, winding of the line link secondary hold magnet 711, and battery, operating the hold magnet. The other branch of conductor 1958 feeds ground through the upper outer make contact of relay 1917, lower outer chain circuit on relay 1904 and the make contact, conductor 1959, a make contact of key 1909, conductor 1741, left outer make contact of relay 1709, to the windings of send link primary hold magnets 1700 and 1701 in parallel to battery, operating the magnets.

The sender link primary hold magnets 1700 and 1701 in operating close the cross-points to connect the district junctor leads to the sender link. The ground used for operating the hold magnet is extended forward over conductor 1742 to the windings of the secondary hold magnets 1704 and 1705 in parallel to battery, operating the latter magnets. These secondary hold magnets close their cross-points to extend the link leads through to the sender. Included among these leads is the sleeve conductor 1743 which later is to serve as a locking lead for the four hold magnets but which at the moment carries their operating ground into the sender, through a make contact of sender relay 2300, back over conductor 2144, make contact of relay 1814, conductor 1833, contact of key 1909, conductor 1960, winding of relay 2005, conductor 2044, lower outer make contact of relay 1908, to battery. Relay 2005 operates and thus serves to check the closing of the cross-points at both ends of the sender link. The upper inner continuity contacts of relay 2005 open the operating ground of relay 1917 and at the same time switch this ground over conductor 2045, winding of relay 2006, to conductor 1960, while another make contact of relay 2005 applies supplementary ground to conductor 2045. Relay 1917 now restores and opens the energizing ground for the four sender link hold magnets and relay 2005 as well, leaving magnets and relay dependent for their holding circuit upon the ground applied to conductor 1960 through the winding of relay 2006. Relay 2006 now makes a double connection test; for if the sleeve of the connection just established is closed with or otherwise in contact with the sleeve of another busy connection, ground from the latter will shunt relay 2006 and prevent it from operating. In such case the time alarm will operate. Assuming, however, that no such trouble condition is present, relay 2006 will operate in series with the four sender link hold magnets and relay 2005, all in parallel, to battery. Relay 2006 in operating, energizes relay 2013 in a path from ground, left outer break contacts of relay 1910, conductor 1961, make contact of relay 2006, winding of relay 2013, lower inner make contact of relay 2005, resistance 2004, conductor 2046, right outer make contacts of relay 1912 and battery. Relay 2013 at its upper make contacts locks itself to ground, and closes ground to conductor 2047 for a purpose to be explained further on.

The sender link primary hold magnets 1700 and 1701 not only close the cross-points, but at their local contacts they close certain control leads. Magnet 1700 grounds conductor 1745 to operate relay 2207 in the district junctor circuit, and magnet 1701 provides a locking path for the line link secondary hold magnet, connecting ground for this purpose over conductor 1744, break contact of district relay 2211, through resistance 2200, sleeve conductor 753 of the district junctor to the line link frame, locking or local contact and winding of line link secondary hold magnet 711, to battery.

The closure of the cross-points by line link secondary hold magnet 711 connects the operating ground of the latter magnet through its local contacts and through the sleeve cross-point to sleeve conductor 751 of the line link. This ground is extended to the line link control circuit and the winding of the test relay such as 1615, corresponding to the line link under consideration. Relay 1615 upon operating provides a check upon the closure of the line link secondary cross-points, since it serves to close the operating path of the line link primary hold magnet. This operating path for primary hold magnet 704 may be traced from battery, winding of hold magnet 704, conductor 747, a make contact of relay 707, common lead 749, a right make contact of relay 1208, conductor 1227, make contact of transfer spring on operated chain relay 1511, conductor 1537, through the upper outer make contact of relay 1515, conductor 1542, right outer chain circuit and make contact of relay 1609, lower make contact of relay 1615, conductor 1648, a make contact of relay 1213, conductor 1249, a make contact of relay 1218, to common control lead 1250 extending to the sender link circuit, key 1909, conductor 1964, and ground at the lower inner break contact of relay 2008. Primary hold magnet 704 upon operating closes the cross-points including its own lock circuit to sleeve conductor 751 of the link. Hold magnet 704 also serves as the cut-off relay, for at its lower break contacts it detaches ground from the tip conductor, and line relay battery from the ring conductor of the subscriber's line. Line relay 706 upon restoring removes ground from the conductor 724, thus releasing relay 1508 in the line link control circuit.

Relay 1508, in releasing, closes a circuit traceable from ground, upper inner make contact of relay 1510, upper outer break contact of relay 1508, conductor 1543, a make contact of relay 1021, conductor 1036, make contact of relay 1218, common conductor 1251 extending to the sender link frame, a make contact of relay 1814, conductor 1836, to the sender circuit, a make contact of sender relay 2300, make contact of sender relay 2304, winding of sender relay 2305, to battery. Sender relay 2304, controlling the circuit of relay 2305, has already been operated as a result of the registration of the class of service and district frame indications. Sender relay 2305 in operating closes ground over conductor 2148, to operate sender busy relay 2112, and the latter relay breaks the operating path of relay 2109 and opens its portion of the test path to conductor 2134, in order to mark the sender as busy.

*Test for tandem ground*

Sender relay 2305 also prepares the test of the subscriber's line for the ground indicating a tandem call, by closing a circuit from ground over a make contact of relay 2300, make contact of relay 2305, break contact of relay 2306, winding of relay 2350 to battery. Relay 2350 closes a circuit from ground over one of its make contacts, through resistance 2351 to the right winding of relay 2352. Relay 2352 operates, in turn, operating relay 2306. While relay 2306 opens the operating circuit of relay 2350, the latter relay is made sufficiently slow to release to permit the completion of the line test. With relays 2350, 2352 and 2306 operated, the tip and ring conductors of the line which have been extended over the primary line link switch, line link conductors 769 and 770, secondary line link switch, district junctor conductors 767 and 768, conductors 1749 and 1750, sender link primary switch, sender link conductors 1747 and 1748, sender link secondary switch, to conductors 2150 and 2151, are further extended over contacts of relay 2305, are connected together over the make contacts of relay 2306 and thence in common over the break contact of relay 2354, rectifier 2355, winding of relay 2353, to 110-volt battery.

If the subscriber at substation 700 wishes to make a local call no ground will be present on the line conductors and relay 2353 will not operate. When relay 2350 releases, relays 2352 and 2306 also release and the tip and ring leads are switched by relay 2306 to the tone coil 2312 and pulsing relay 2309, respectively. Relay 2309 operates over the line loop and the calling subscriber receives dial tone, from tone coil 2312, to authorize the dialing of the wanted number. Relay 2309 operates relays 2310 and 2311 in an obvious circuit, and relay 2311 operates relay 2303. Relay 2302 now operates in a path traceable from battery, through the winding of relay 2302, break contact of relay 2357, make contact of relay 2303, conductor 2146, right outer make contact of sender busy relay 2112, just operated, conductor 2145, make contact of relay 2300, conductor 1834, a front contact of relay 1814, conductor 1962, key 1909, conductor 2048, upper break contact of relay 2014, conductor 2047, upper make contact of relay 2013, to ground. Sender relay 2302 operates over the path just traced, and locks itself and relay 2305 in an obvious circuit to ground at its own contact 2315. Relay 2302 also connects its locking ground through its left inner make contact to conductor 2314, thence to conductor 1743, which last conductor extends back through the sender link cross-points and provides a lock circuit for the sender link hold magnets. Sender relay 2302 also connects ground from its locking circuit, through its right outer and left middle make contacts, conductor 2316, a make contact of relay 2300, over release lead 2147 to the sender link circuit, through a make contact of relay 1814, conductor 1835, key 1909, conductor 1963, lower inner make contact of relay 2013, conductor 2049, winding of relay 2007, and battery. Relay 2007 operates, energizes release relay 2008, and locks itself in a circuit through the upper outer make contact of relay 2005, lower outer make contact of relay 2007, conductor 1933, key 1909, conductor 1934, break contact of relay 1770, make contact of relay 1713, to ground. Release relay 2008 at its upper outer contacts opens ground from conductor 2034 to restore relay 1918, and returns ground over conductor 1937 in order to hold relay 1902 operated and to maintain ground on the off-normal ground lead. Relay 1918 at its upper make contacts opens the preference lead ground whereby the line link secondary hold magnet was operated. Release relay 2008 at its lower inner transfer contacts detaches ground from conductor 1964 and switches the latter to conductor 2050 and through the lower middle break springs of relay 1918 now normal, to branching conductor 1965, over one branch to the locking winding of the release relay 2008, and over the other branch extending through key 1909 to conductor 1966, to the line link frame, a make contact of relay 1218, conductor 1252, a make contact of relay 1213, conductor 1253, right outer make contact of control circuit relay 1507, upper inner break contact of relay 1508, winding of release relay 1509, and battery. Both hold magnets on the line link frame have now been deprived of their operating ground, so that both magnets are dependent upon their locking path already traced through the cross-points and the link sleeve conductor, through the district junctor sleeve conductor, through the district junctor circuit, to ground controlled by the sender link primary hold magnet. This holding ground backs up over the path just traced above, to hold the sender link release relay 2008 and operates the line link release relay 1509. The continuity of the sleeve holding path is thus verified by the immediate release of the control circuits, whereas discontinuity of the holding path will delay release of the control circuit until the alarm circuit operates.

Sender link release relay 2008 and line link release relay 1509 bring about the release of the sender link control circuit and the line link control circuit as described in detail in the previously mentioned Busch et al. patent. The two sender relays 2300 and 2301 are also deenergized as a result of the release of the sender link control circuit.

After the line link control circuit and the sender link control circuit have been restored to normal the calling subscriber's line remains connected through the line link, the district junctor and the sender link to the sender, and the sender holds the connection.

*Test for tip party*

When relay 2302 operates, as above-described, it closes a circuit from battery through the winding of relay 2354, left normal contact of relay 2356 to ground at a contact of relay 2302. Relay 2305, in operating, connects ground through resistance 2361 to the left winding of relay 2352, energizing that relay in the non-operate direction, but relay 2354 when operated, closes a circuit from ground at a make contact of relay 2305, resistance 2361, over the make contact of relay 2354 to battery through the right winding of relay 2352, causing relay 2352 to operate. Relay 2352 closes a circuit for relay 2306 which disconnects the tip and ring conductors from relay 2309 and coil 2312 and connects the tip and ring conductors together and to a break contact of relay 2354 which is open at this time. However, relay 2354 operated, supplies substitute connections from the tip and ring conductors to relay 2309 and coil 2312, so that relay 2309 remains operated, maintaining a circuit from ground over the make contact of relay 2305, make contact of relay 2309, windings of relays 2310 and 2311, in series, to battery. Relay 2310 is quick acting and therefore operates and releases with relay 2309, while relay 2311, being slow to release remains operated continuously during dialing and establishes an obvious circuit for relay 2303 which also remains operated during dialing. When the tip party moves his dial off-normal for the first digit, ground is connected as above-described through the ringer to the line conductors.

Upon release of relays 2309 and 2310 in response to the first dial impulse received from the calling line, relay 2358 operates over a circuit from battery through its winding, make contact of relay 2311, break contact of relay 2310 to ground and, being slow to release, remains operated during the impulse series.

When relay 2358 operates, a circuit is established from ground at the make contact thereof, over the right normal contacts and winding of relay 2356 to battery. Relay 2356 thereupon operates, locks over its right alternate contacts to ground at the make contact of relay 2302 and transfers the holding circuit for relay 2354 over its left alternate contacts from ground at the contact of relay 2302 to ground at the front contact of relay 2358. When relay 2358 releases at the end of the first digit series, relay 2354 releases, in turn opening the circuit through the right winding of condenser timed relay 2352 and the shunt around condenser 2359. Condenser 2359 starts to charge through the right winding of relay 2352, and until it becomes fully charged the charging current flowing through that winding holds relay 2352 operated.

With relay 2354 released and until relay 2352 finally releases, the test circuit previously traced is again established from the source 2360 of 110-volt battery, through the right winding of relay 2353, through the rectifier 2355, break contact of relay 2354, the right alternate contacts of relay 2306, front contacts of relay 2305, conductor 2150 and thence as traced to the tip conductor of the calling line, and in parallel over the left alternate contact of relay 2306, contact of relay 2305 to conductor 2151 and the ring conductor of the calling line.

Since it has been assumed that the calling subscribed is a tip party, relay 2353 will be operated, closing a circuit over its make contact and the break contact of relay 2350 to conductor 2360 to set up a record of that fact and to control the metering of the call in the usual manner. When relay 2352 releases, relay 2306 also releases restoring the circuit of relay 2309 and placing the sender in readiness for receiving the next digit. The ground used for operating relay 2358 is removed by means not shown to prevent a repetition of the test after other digits.

The sender and the marker control the completion of the connection. The sender, before disconnecting itself and the link, operates district relay 2203, which relay, upon operating, connects the calling line to a source of battery current through the windings of relay 2210, and completes the talking path through condensers 2202 and 2204, to the called line. A non-battery ridge comprising retardation coil 2208 and polarized relay 2209, in series, is connected also at this time across the tip and ring conductors to furnish called-party supervision in connection with the terminating equipment. Relay 2210, whose windings feed battery current to the calling line, operates over the calling line loop and holds relay 2207 operated. Relay 2207 connects ground from its upper outer make contact, through make contact 2229 on relay 2203, through break contact 2230 on relay 2205 paralleled by break contact 2231 on relay 2213, to resistance 2200 and sleeve conductor 753, and so to the locking circuit of the line link hold magnets. This same ground from relay 2207 just traced to resistance 2200, also branches through make contact 2232 on relay 2203 to the winding of the latter relay, holding it locked. Relay 2203 feeds ground from its upper inner make contact, through the upper inner break contact of relay 2205, upper outer break contact of relay 2206, sleeve conductor 2233 to the district link frame thus holding the district and office links in operated position. The sender and the sender link now restore, leaving the calling subscriber in control of the connection. When the calling subscriber restores his receiver at the end of the conversation the circuit of relay 2210 is opened and relays 2210, 2207 and 2203 fall back and open the sleeve holding grounds both ways, thus causing disconnection.

*Tandem call*

If either party on the calling line wishes to establish a tandem call, the operation of the tandem key 112, connects ground through ringer 134 to the tip conductor 124 and through the subset to conductor 125 and ground will be present on the line conductors 2150 and 2151 when the preliminary test is made, operating relay 2353. With relay 2350 operated, the operation of relay 2353 connects ground over its make contact, make contact of relay 2350, to the winding of relay 2357 and battery. Relay 2357 locks to the ground on conductor 2139 by which relay 2300 was operated and connects ground over its left contact, make contact of relay 2300 to conductor 2362. Relay 2357 at its right contact also opens the operating circuit of relay 2302, thereby preventing the operation of relay 2302, the connection of ground to conductors 2314 and 2316 and the release of the sender link control circuit and the line link control circuit.

The ground connected to conductor 2362 completes a circuit over a make contact of relay 1814, conductor 1850 to the winding of relay 1770 and battery. Relay 1770 opens the operating circuit of relay 1709 which, in turn opens the operating circuit of magnets 1700 and 1701. However, these magnets are held operated temporarily under the control of relay 2005.

In addition, relay 1770 opens the operating circuit of relay 1908 and that relay releases, in turn releasing relay 2005 and the hold magnets 1700, 1701, 711 and 704. Relay 1908 also releases relay 1902 as well as any of the relays 1904, etc. which had been operated and locked. The release of these relays causes relays 1916 and 1920 to release also. With relay 1916 released, the operating circuit for relay 1919 is reclosed and that relay reoperates, in turn reoperating relay 1903. With relay 1903 reoperated, a circuit is closed for reoperating relay 1908 which may be traced from battery through the winding of relay 1908, make contact of relay 1903, conductor 1975, make contact of relay 1770 to ground at a make contact of relay 1713. Relay 1908 operates in this circuit, locking under the control of relay 1770 independent of relay 1903. Relay 1902 is also reoperated.

The sender control circuit is now in condition to make a retest of the district junctors of the selected group. However, with relay 1770 operated, the test conductors of the district junctors are opened and the test conudctors of the tandem trunks included in the selected group are now closed through to the group of test relays 1904, etc. An idle trunk causes the operation of the corresponding test relay, for example relay 1907, followed by the operation of relay 1916, and the release of relays 1919 and 1903.

When relay 1903 releases, relay 1918 operates in a circuit similar to that previously traced but which includes a make contact of relay 1770 in place of the make contact of relay 1917. With relay 1918 operated, relay 1907 closes a circuit which is similar to that traced from relay 1904 to magnet 711, for operating the line link secondary hold magnet 713 associated with the tandem trunk. Since relay 1709 is released, no circuit is closed for a sender link primary hold magnet.

The closure of the cross-points by magnet 713 extends ground over the sleeve conductor of the line link to relay 1615 as previously described, and relay 1615 in turn operates the line link primary hold magnet 704, releasing line relay 706.

Since both primary and secondary line link switches have operated, the line relay 2250 of the tandem trunk has operated over the line loop, connecting ground to the sleeve conductor 2251 thereby supplying a locking circuit for the hold magnets 713 and 704.

Relay 706 in releasing disconnects ground from conductor 724 thereby opening the circuit of relay 1508 and causing that relay to release. With relay 1770 operated, the release of relay 1508 closes a circuit from ground at a break contact of relay 1508, conductor 1570, make contact of relay 1213, make contact of relay 1218, conductor 1270, make contact of relay 1713, make contact of relay 1770 to conductor 1966, operating release relay 2008 in the sender link control circuit and release relay 1509 of the line link control circuit. These relays function as previously described to release the control circuits. Since relay 2302 has not been operated, the release of the sender control circuit, releasing relays 2300, 2301 and 2357 also releases the sender.

As an alternative to the above arrangement, the ground detecting relay 2353 may be arranged to operate a relay such as relay 2370, which relay would lock under the control of relay 2302, open the dial tone circuit, close the start circuit of the marker connector and transmit a signal to the marker. The marker in response to this signal would then select a trunk outgoing to the tandem office in the usual manner, completing a connection from the calling line through the district junctor to the equipment at the tandem office.

What is claimed is:

1. In a telephone system, a local office, a distant office, a calling line in said local office, tandem trunks leading to said distant office, a cross bar line switch into which calling lines are coming having access to said tandem trunks, a register sender, means responsive to a call originated by said calling line to connect said calling line over said line switch with an idle register sender, means to apply a signal to said calling line, means in said register sender to test for said signal on said calling line, and means under the control of said signal test means to operate said line switch to connect said calling line with an idle one of said tandem trunks.

2. In a telephone system, a local office, a distant office, a calling line in said local office, tandem trunks leading to said distant office, a cross bar line switch into which calling lines are coming having access to said tandem trunks, a register sender, means responsive to a call originated by said calling line to connect said calling line over said line switch with an idle register sender, means to ground said calling line, means in said register sender to test for ground on said calling line, and means under the control of said ground test means to operate said line switch to connect said calling line with an idle one of said tandem trunks.

3. In a telephone system, a local office, a distant office, a calling line in said local office, tandem trunks leading to said distant office, a cross bar line switch into which calling lines are coming having access to said tandem trunks, a register sender, means responsive to a call originated by said calling line to connect said calling line over said line switch with an idle register sender, key controlled means to ground said calling line, means in said register sender to test for ground on said calling line, and means under the control of said ground test means to operate said line switch to connect said calling line with an idle one of said tandem trunks.

4. In a telephone system, a local office, a distant office, a calling line in said local office, tandem trunks leading to said distant office, a cross bar line switch having access to said tandem trunks, a register sender, means responsive to a call originated by said calling line to connect said calling line over said line switch with an idle register sender, key controlled means to ground said calling line, dial control means to ground said calling line, means in said register sender to test for ground on said calling line, and means under the control of said ground test means in response to said key controlled ground to operate said line switch to connect said calling line with an idle one of said tandem trunks.

5. In a telephone system, a local office, a distant office, a calling line in said local office, tandem trunks leading to said distant office, a cross bar line switch having access to said tandem trunks, a register sender, means responsive to a call originated by said calling line to connect said calling line over said line switch with an idle register sender, key controlled means to ground said calling line, dial controlled means to ground said calling line, means in said register sender to test for ground on said calling line, means to repeatedly associate said ground test means with said line, and means under the control of said ground test means following the first association with said line to operate said line switch to connect said calling line with an idle one of said tandem trunks.

6. In a telephone system, a local office, a distant office, a calling line in said local office, a dial and a key associated with said line, tandem trunks leading to said distant office, a cross bar line switch having access to said tandem trunks, a register sender, means responsive to a call originated by said calling line to connect said calling line over said line switch with an idle register sender, means under the control of said key to ground said calling line, means under the control of said dial to ground said calling line, means in said register sender to test for ground on said calling line, means responsive to the connection of said calling line with said register sender to associate said ground test means with said line to test for said key controlled ground, means responsive to the operation of said dial to associate said ground test means with said line to test for said dial controlled ground, means under the control of said ground test means in response to said key controlled ground to operate said line switch to connect said calling line with an idle one of said tandem trunks, and means under the control of said ground test means in response to said dial controlled ground to register the class of said calling line.

7. In a telephone system, a local office, a distant office, a calling line in said local office, local district junctors, tandem trunks leading to said distant office, a cross bar line switch having access to said junctors and to said tandem trunks, a register sender, means responsive to a call originated by said calling line to operate said line switch to connect said calling line with an idle local district junctor, means for connecting said calling line with an idle register sender, means to apply a signal to said calling line, means in said register sender to test for said signal on said calling line, and means under the control of said signal test means to release said local district junctor and to reoperate said line switch to connect said calling line with an idle one of said tandem trunks.

8. In a telephone system, a local office, a distant office, a calling line in said local office, local district junctors, tandem trunks leading to said distant office, a cross bar line switch having access to said junctors and to said tandem trunks, a register sender, means responsive to a call originated by said calling line to operate said line switch to connect said calling line with an idle local district junctor, means for connecting said calling line with an idle register sender, means to ground said calling line, means in said register sender to test for ground on said calling line, and means under the control of said ground test means to release said local district junctor and to reoperate said line switch to connect said calling line with an idle one of said tandem trunks.

9. In a telephone system, a local office, a distant office, a calling line in said local office, local district junctors, tandem trunks leading to said distant office, a cross bar line switch having access to said junctors and to said tandem trunks, a register sender, means responsive to a call originated by said calling line to operate said line switch to connect said calling line with an idle local district junctor, means for connecting said calling line with an idle register sender, key controlled means to ground said calling line, means in said register sender to test for ground on said calling line, and means under the control of said ground test means to release said local district junctor, and to reoperate said line switch to connect said calling line with an idle one of said tandem trunks.

10. In a telephone system, a local office, a distant office, a calling line in said local office, local district junctors, tandem trunks leading to said distant office, a cross bar line switch having access to said junctors and to said tandem trunk, a register sender, means responsive to a call originated by said calling line to operate said line switch to connect said calling line with an idle local district junctor, means for connecting said calling line with an idle register sender, key controlled means to ground said calling line, dial controlled means to ground said calling line, means in said register sender to test for ground on said calling line, and means under the control of said ground test means in response to said key controlled ground to release said local district junctor and to reoperate said line switch to connect said calling line with an idle one of said tandem trunks.

11. In a telephone system, a local office, a distant office, a calling line in said local office, local district junctors, tandem trunks leading to said distant office, a cross bar line switch having access to said junctors and to said tandem trunks, a register sender, means responsive to a call originated by said calling line to operate said line switch to connect said calling line with an idle local district junctor, means for connecting said calling line with an idle register sender, key controlled means to ground said calling line, dial controlled means to ground said calling line, means in said register sender to test for ground on said calling line, means to repeatedly associate said ground test means with said line and means under the control of said ground test means following the first association with said line, to release said local district junctor and to reoperate said line switch to connect said calling line with an idle one of said tandem trunks.

12. In a telephone system, a local office, a distant office, a calling line in said local office, a tip party substation and a ring party substation connected with said line, a dial and a key at each of said substations, local district junctors, tandem trunks leading to said distant office, a cross bar line switch having access to said junctors and to said tandem trunks, a register sender, means responsive to a call originated by either of said substations to operate said line switch to connect said calling line with an idle local district junctor, means for connecting said calling line with an idle register sender, means under the control of said keys to ground said calling line, means under the control of the dial at said tip party substation to connect ground to said line independent of said key, means under the control of the dial at said ring party substation to remove said key controlled ground from said line, means in said register sender to test for ground on said calling line, means responsive to the connection of said calling line with said register sender to associate said ground test means with said line to test for said key controlled ground, means responsive to the operation of said dial to associate said ground test means with said line to test for said dial controlled ground, means under the control of said ground test means in response to said key controlled ground to release said local district junctor and to reoperate said line switch to connect said calling line with an idle one of said tandem trunks and means under the control of said ground test means in response to said dial controlled ground to indicate that the tip party substation is calling.

13. In a telephone system, a local office, a distant office, a calling line in said local office, local district junctors, tandem trunks leading to said distant office, cross bar line switches having access to said district junctors and said tandem trunks, a control circuit, means in said control circuit for testing said district junctors and said tandem trunks, a register sender, means in said control circuit responsive to a call originated by said calling line to operate said test means for selecting an idle district junctor, to operate said line switches to connect said calling line with the selected district junctor and to connect said line and said district junctor with said register sender, means to apply a signal to said calling line, means in said register sender to test for said signal on said calling line, and means under the control of said signal test means to reoperate the testing means in said control circuit to select an idle tandem trunk, to disconnect said line from said district junctor and reoperate said line switch to connect said line with said tandem trunk.

14. In a telephone system, a local office, a distant office, a calling line in said local office, local district junctors, tandem trunks leading to said distant office, cross bar line switches having access to said district junctors and said tandem trunks, a control circuit, means in said control circuit for testing said district junctors and said tandem trunks, a register sender, means in said control circuit responsive to a call originated by said calling line to operate said test means for selecting an idle district junctor, to operate said line switches to connect said calling line with the selected district junctor and to connect said line and said district junctor with said register sender, means to ground said calling line, means in said register sender to test for ground on said calling line, and means under the control of said ground test means to reoperate the testing means in said control circuit to select an idle tandem trunk, to disconnect said line from said district junctor and reoperate said line switch to connect said line with said tandem trunk.

RALPH E. HERSEY.

REFERENCES CITED

The following references are of record in the file of this patent:

UNITED STATES PATENTS

| Number | Name | Date |
| --- | --- | --- |
| 1,623,769 | Williams | Apr. 5, 1927 |
| 1,625,235 | Bellamy | Apr. 19, 1927 |
| 1,651,017 | Deakin | Nov. 29, 1927 |
| 2,094,140 | Wochinger | Sept. 28, 1937 |
| 2,137,626 | Quarg | Nov. 22, 1938 |